United States Patent [19]

Kohashi

[11] 4,396,925

[45] Aug. 2, 1983

[54] ELECTROOSMOTIC INK PRINTER

[75] Inventor: Tadao Kohashi, Moriguchi, Japan

[73] Assignee: Matsushita Electric Industrial Co., Ltd., Kadoma, Japan

[21] Appl. No.: 301,449

[22] Filed: Sep. 11, 1981

[30] Foreign Application Priority Data

Sep. 18, 1980 [JP] Japan ............................... 55-130392

[51] Int. Cl.³ ............................................ G01D 15/18

[52] U.S. Cl. ............................................... 346/140 R

[58] Field of Search ........ 346/140 R, 140 IJ, 140 PD, 346/1.1

[56] References Cited

U.S. PATENT DOCUMENTS

| | | | |
|---|---|---|---|
| 3,375,528 | 3/1968 | Klavsons et al. | 346/140 PD |
| 3,969,733 | 7/1976 | DeMoss et al. | 346/1.1 |
| 4,023,180 | 5/1977 | Zenner | 346/140 PD X |
| 4,263,601 | 4/1981 | Nishimura et al. | 346/1.1 |
| 4,315,267 | 2/1982 | Sonoda et al. | 346/1.1 |

*Primary Examiner*—Donald A. Griffin
*Attorney, Agent, or Firm*—Cushman, Darby & Cushman

[57] ABSTRACT

An end tip part of one side of plural recording electrodes are disposed insulated from one another facing a recording surface of recording medium, and these electrodes are inserted into plural plate-or film-shaped solid state dielectric porous or non-porous substance substrates, and an auxiliary electrode is disposed on one or both outer surfaces of this solid state dielectric substance substrates, and a fluid ink is fed to this recording head, and also signal voltage is applied across the recording electrode and the auxiliary electrode, thereby the electroosmotic travelling of fluid ink is carried out, the fluid ink forming this ink pattern is to fly and deposit onto the recording medium by means of coulomb force or electroosmotic pressure.

36 Claims, 16 Drawing Figures

ELECTROOSMOTIC INK PRINTER

BACKGROUND OF THE INVENTION

1. Field of the Invention

The present invention relates to a recording apparatus which prints an ink picture by depositing a fluid ink by means of flying or contacting on a recording medium such as paper or the like according to input signal information such as picture of the like.

2. Prior Arts

As method of picture recording on a plain paper, several methods have been proposed. Among such proposed methods, ink-jet method and magnetic fluid ink method are known as practical methods.

The ink-jet method has several types therein, but the fundamental principle thereof is that fluid ink is spouted from a nozzle having a very fine hole on a plain paper. Among the ink-jet method, a method called ink-on-demand type (disclosed by E. Stemme et al in IEEE Transactions on Electron Devices vol. ED-20 p14), which modulates amount of the spouted ink corresponding to input picture signal by utilizing electric vibration of a piezoelectric device, is attracting an attention, since it can easily carry out a high speed recording.

On the other hand, magnetic ink recording method has several types, and among them a method called as magnetic ink flying recording (disclosed by Yoichi Sekine et al in the Japanese unexamined Patent publication No. SHO54-23534), which makes fluid magnetic ink to become protruded by means of magnetic force, is attracting attention in simplicity and high resolution.

The above-mentioned ink-jet method has a defect which is substantially difficult to eliminate. That is, the nozzle with a fine hole is likely to be choked with dried ink which makes the operation impossible. This is the most important and difficult point to improve.

The above-mentioned magnetic ink flying method requires an inclusion of magnetic fine powder of, for instance, magnetite or $\gamma$-ferrite. This magnetic powder is likely to cause chemical change due to oxidation and etc, and makes the record change from black color to brownish black color. Besides, color of the magnetic ink is limited and therefore range of color selection of the ink is narrow; especially, to produce inks of high color purities of cyan, magenta and yellow have been very difficult, and therefore, color printing by the magnetic ink method has been technically difficult.

From the abovementioned standpoint, the present inventor previously proposed a recording apparatus employing an ink printing head having substantially a needle-shaped recording electrode, an auxiliary electrode so installed as to surround the abovementioned needle-shaped recording electrode on a perpendicular plane to above-mentioned recording electrode, and a dielectric substance substrate so disposed as to connect between the above-mentioned both electrodes.

The abovementioned head is a recording head which forms a protrusion of fluid ink by means of electroosmotic travelling of fluid ink for a dielectric substance and its principle is that this protruded fluid ink is caused to fly and deposit onto a recording medium by means of coulomb force to record and reproduce an ink picture on a recording medium corresponding to picture signal. (Japan Patent Application Sho 55-113887 of Aug. 18, 1980).

In the abovementioned apparatus, a needle-shaped recording electrode is installed on one surface of a sheet-shaped dielectric substance substrate facing a recording medium, and the recording electrode is disposed close to the recording medium, having an exposed conductive end tip part, and an auxiliary electrode surrounding this recording electrode is installed on the dielectric substance substrate surface on which the fluid ink is disposed, and a voltage is applied across the recording electrode and the auxiliary electrode.

In this apparatus, a protrusion of ink is formed on the abovementioned exposed conductive end part surface by electroosmotic travelling of fluid ink, and a high voltage is applied across the recording electrode and the recording medium, thereby the ink is caused to fly onto the recording medium by means of this coulomb force.

However, in such a configuration that the end tip part of recording electrode and the auxiliary electrode are formed on the same surface in an exposed fashion, three-dimensional wiring is required to supply voltage between this end tip part and the auxiliary electrode while insulating them each other, or an electric insulation of the auxiliary electrode against the fluid ink is required to prevent any unnecessary ink protrusion other than the abovementioned exposed end tip part. These drawbacks are liable to cause an operational instability and often makes a high resolution of recording difficult because of production engineering problems.

Furthermore, the average ink recording requires a passing-through installation of high density as many as 8 lines/mm in the abovementioned structure, but this includes a problem of difficult production engineering because the recording electrode is installed by passing through the dielectric substance substrate.

SUMMARY OF THE INVENTION

The present invention purposes to provide a recording apparatus having a structure so improved that the abovementioned practical problems may be overcome.

The present invention can provide an ink-contacting type recording apparatus which records an ink printed picture on a recording medium by means of contact transcription onto the recording head tip part without employing a fluid ink flying.

Furthermore, the present invention also purposes to provide an ink-flying type recording apparatus wherein a fluid ink flies and deposits onto the recording medium by electroosmotic pressure.

DESCRIPTION OF PREFERRED EMBODIMENTS

An apparatus in accordance with the present invention is mainly characterized in that an end tip part of one side of a single recording electrode or plural recording electrodes insulated from one another faces a recording surface of a recording medium, and these electrodes are inserted into plural plate- or film-shaped solid state dielectric porous or non-porous substance substrates, and an auxiliary electrode is disposed on one or both outer surfaces of this solid state dielectric substance substrates. A fluid ink is fed to this recording head, and also a signal voltage is applied across the recording electrode and the auxiliary electrode, thereby the electroosmotic travelling of the fluid ink is carried out through the electroosmotic travelling path on the surface of nonporous plate or inside the porous plate of the dielectric substance substrate to form a fluid ink pattern on the abovementioned end tip part with at least either the ink amount or the ink protrusion amount controlled. The fluid ink forming this ink pattern is made to fly and deposit onto the recording medium by means of coulomb force or electroosmotic pressure or the recording medium is made to contact directly with this ink pattern, thereby an ink image corresponding to the input signal is recorded and reproduced on the recording medium.

In this invention the term fluid ink is defined as a fluid comprising a solvent or a dispersion media, a dye as solute dissolving in the solvent or pigment as disperse phase dispersing in the dispersion media, and other additives, for instance, vehicle substance or binder, charge control agent, surfactant etc.

The term electroosmotic phenomenon or electrokinetic phenomenon is defined that, when a solid state substance and a liquid state fluid are contacting with each other, an interfacial electric double layer is formed, and when an electric field having a component parallel to the interface is impressed on the interface, a force to move the fluid in relation to the solid state substance, thereby making the fluid travel along the interface in relation to the solid state substance.

In this invention the substrate of a dielectric substance includes not only solid dielectric substance but also porous or spongy dielectric substance which a considerable area of internal surfaces within its body and can form the interface in the interior of its body.

The invention is further elucidated in detail with reference to the attached drawings showing embodiments of the present invention.

Figure 1:
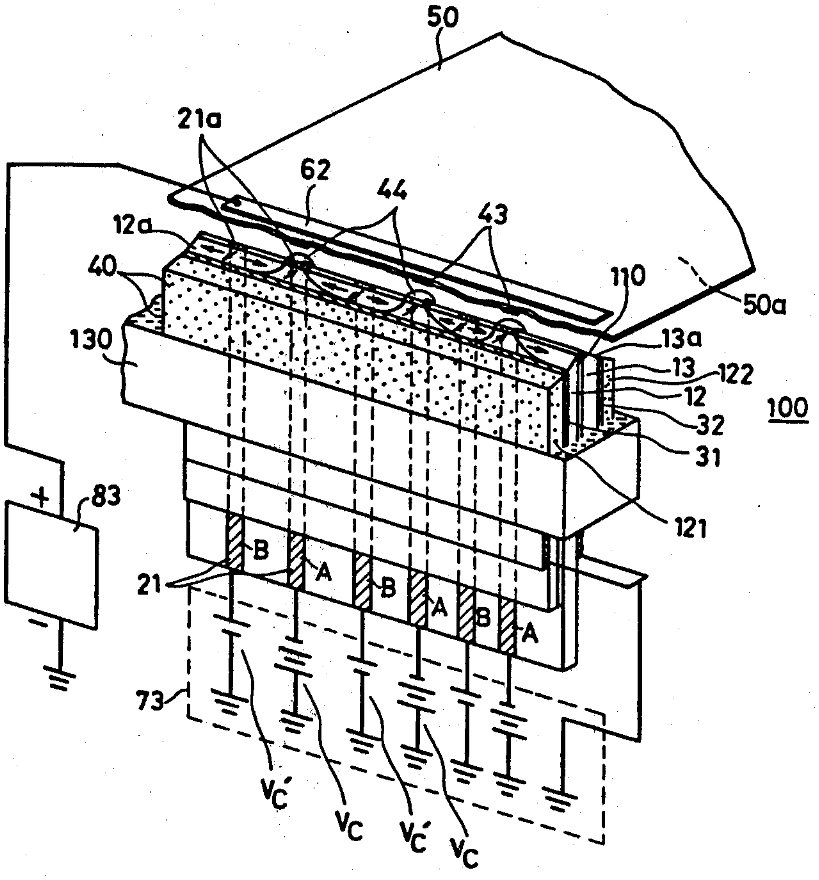
FIG. 1 is a perspective view of the first embodiment of a recording apparatus in accordance with the present invention.

FIG. 1 is a perspective view showing a configuration of the first embodiment of a recording apparatus in accordance with the present invention.

A recording apparatus of the present embodiment has a single recording electrode or plural recording electrodes insulated from one another having an exposed conductive end tip part facing a recording medium, and these recording electrodes are constituted respectively by inserting into plate- or film-shaped solid state dielectric substance substrates having auxiliary electrodes on their outer surfaces, and this apparatus is constituted by providing a means, of supplying these dielectric substance substrates with a fluid ink, a means of forming a protrusion of the abovementioned fluid ink on the exposed conductive end tip part of the abovementioned recording electrode by means of electroosmotic travelling of the abovementioned fluid ink through the abovementioned dielectric substance substrate with a voltage application across the abovementioned recording electrode and the abovementioned auxiliary electrode, and a means of flying of this ink protrusion onto the recording medium by means of coulomb force corresponding to input signal.

In the figure, 100 is a recording head, 12 and 13 are thin-plate-form or film-form solid state dielectric substance substrates, and 21 are recording electrodes insulated from one another which are inserted between a pair of dielectric plates 12 and 13 with a predeter-mined pitch, being adhered with an adhesive 110. **21*a*, conductive end tip parts of the recording electrodes 21, are respectively exposed, facing a recording surface 50*a* of recording sheet or medium 50** such as paper or the like (bottom surface in the figure).

Auxiliary electrodes 31 and 32 are coated respectively on the outer surfaces of the dielectric substance substrates 12 and 13, thereon porous insulating bodies 121 and 122 are installed respectively, and are immersed into an ink pot 40 filled with a fluid ink 40, and the fluid ink 40 is supplied to active end faces **12*a* and 13*a* by utilizing a capillary phenomenon of the porous bodies 121 and 122**.

A configuration is made in such a manner that the recording electrodes 21 and the auxiliary electrodes 31 and 32 are connected respectively to a power source 73, and voltages selectively modulated by input information signal Vc and Vc' are applied to the recording electrodes 21 with respect to the auxiliary electrodes 31 and 32.

Some instantaneous picture signal is schematically exemplified in the figure. A counter electrode 62 is installed at the back side of a part of recording sheet or medium 50 facing the conductive end tip part **21*a***.

This electrode 62 is connected to a high voltage power source 83 and a high voltage is applied across the auxiliary electrodes 31, 32 and the recording electrodes 21.

Furthermore, an electroosmotic travelling of fluid ink is caused on the active end faces **12*a* and 13*a* by means of the abovementioned picture signal voltages Vc and Vc', thereby the fluid ink gathers on the end tip conducting parts 21*a* to form fluid protrusions 44. This amount of protrusion is a fluid ink pattern representing input information, which is made to fly to the recording surface 50***a* by means of coulomb force by the voltage of the power source 83 to form ink deposit spot 43, thereby an ink picture corresponding to input information signal is reproduced and recorded.

The materials for the dielectric substance substrates 12 and 13 and the fluid ink 40 are determined as follows in view of the electroosmotic property of the ink 40 for the embodiments mentioned later as well as the present embodiment like the foregoing embodiments.

For the fluid, that is the solvent or dispersion medium, a substance selected from the following is usable water, alcohols, vegetable oils, mineral oils, aliphatic solvents or aromatic hydrocarbon solvents and organosilane solvents. Into the fluid an ionic dye or a nonionic dye or pigment of diameter smaller than 1 μm or smaller is introduced with the binder substance and the fluid is blended well. Other additives are further added to the fluid. That is, in order to adjust electroosmotic sensitivity, surface tension and specific resistivity, charge control agent and/or surfactant is further blended in the fluid, thereby to form the fluid ink 40. By means of the above-mentioned preparation, the well prepared fluid ink can enjoy the electroosmotic mobility of about $10^{-4}$ $cm^2$/V.sec at the maximum. That is, provided that, for instance a DC voltage is impressed across the recording electrode 20 and the auxiliary electrode 30, and the intensity of electric field on the surface of the dielectric substrate is 1 V/μm (=$10^4$ V/cm), then the fluid ink can travel at a speed of 1 cm/1 sec. The polarity of electroosmosis, that is the direction of electroosmostic ink flow (towards the positive electrode or negative electrode) is determined by the fluid material, coloring agent (dye or pigment) and other additives. In order to attain good electroosmosis of the fluid ink and to avoid undesirable discoloring of dye or pigment by electrolysis, non-ionic coloring agent is preferred. In case pigment is used, a very fine powder as has been described should be used in order to avoid precipitation. The non-ionic dye (i.e., neutral dye) such as oil-soluble dye (oil-dye or solvent dye) is preferable in order to avoid the precipitation or unstable operation due to cataphoresis of the coloring agent.

For example, for black ink, a mixture of Macrolex Blue FR (trade name of Bayer Japan Ltd. of Japan) and Oil Red XO (trade name of Kanto Chemical Co. Inc. of Japan) is used; as oil-soluble blue fluid ink, a mixture of Macrolex Blue PR (trade name of Bayer Japan Ltd.) is used; as oil soluble yellow fluid ink, Ceres Yellow 3G (trade name of Bayer Japan Ltd.) is used and; as oil-soluble red fluid ink, Oil Red 5303 (trade name of Arimoto Chemical Co. Ltd. of Japan) is used.

The fluid ink 40 is prepared by dissolving, for example, one of the above-mentioned mixture or dye in organic solvent at a concentration of 1 to 5 wt%. In one example where the dielectric substrate 10 is principally of boro-silicate glass or cellulose-acetate, and the recording electrode is impressed with a negative potential, that is the electroosmotic ink flow is made towards the negative electrode, such solvent as γ-methacryloxypropyltrimethoxy-silane is used. And when the electroosmosis is made towards the positive electrode, such solvent as phenyl-triethoxy-silane or tetrahexyl-silicate is used.

Instability of operation is prevented by employing an adhesive 110 of the same material as that of the dielectric substance substrates 12 and 13, or of material which cause electroosmotic travelling in the same direction of voltage polarity as that for the dielectric substance substrates 12 and 13 with respect to the fluid ink 40.

Boro-silicate glass plates or cellulose acetate films of about 20 to 100 μm in thickness are employed for the dielectric substance substrates 12 and 13, and a thin conductive film such as indium oxide or tin oxide, or a copper foil of about 18 to 35 μm in thickness is coated on the surface of one of these dielectric substance substrates (13 in the figure), and then the recording electrodes 21 with the conductive end tip part 21*a* of about 50 μm in width and of about 3 to 8 lines/mm in pitch are formed by etching by the photoetching method or by coating graphite or a silver conductive paint by the printing method, Thus the dielectric substance substrates are adhered with the adhesive 110 such as cellulose acetate or cellulose nitrate which shows the same electroosmotic property as these substrates.

The auxiliary electrodes 31 and 32 are coated on the outer surfaces of the dielectric substance substrates 12 and 13 with, for instance, graphite or a conductive paint. A spongy films 121 and 122 such as polyurethane foam or the like are installed on the auxiliary electrodes 31 and 32 respectively, and the fluid ink 40 is supplied to the active end faces 12*a* and 13*a*, respectively.

FIG. 1 exemplifies the motion of the fluid ink by the arrow marks on the active end face 12*a* when a material which causes electroosmotic travelling in the direction toward negative electrode is used for the fluid ink 40.

The voltage Vc negative with respect to the auxiliary electrodes 31 and 32 is applied as the ON voltage based on input picture signal to the electrodes designated by the code A among the electrodes 21 now in charge of a picture element to be ink-recorded by a current input picture signal from the power source apparatus 73, and the positive voltage Vc' is applied as the OFF voltage to the electrodes designated by the code B now in charge of a picture element not to be ink-recorded among the electrodes 21.

The fluid ink 40 concentrates and converges as shown by the arrow marks in the figure on the exposed conductive end tip parts 21*a* of A electrodes from the auxiliary electrodes 31 and 32 through the active end faces 12*a* and 13*a* and produces ink protrusions 44 corresponding to the amplitude of Vc.

On the other hand, the electroosmotic travelling takes place in the direction toward the auxiliary electrodes 31 and 32 on the exposed conductive end tip parts 21*a* of the electrodes B, and also further electroosmotic travelling takes place in the direction toward the conductive end tip parts 21*a* of the electrodes A which is negative through the active end faces 12*a* and 13*a* and the surface of adhesive 110, thereby no ink 40 exists on the exposed end tip parts 21*a* of the electrodes B.

That is, in the instantaneous electroosmotic travelling as mentioned above, the formation of ink protrusions 44 on the conductive end tip parts of electrodes A is carried out, and concurrently the ink protrusions 44 on the electrodes B disappear, thus the fluid ink pattern representing input information of Vc and Vc' is formed.

Vh, a positive voltage (that is, reverse polarity of Vc, the same polarity as Vc' and higher than Vc'), is applied across the auxiliary electrodes 31 and 32 and the counter electrode 62 from the high voltage power source 83, and its amplitude is varied within a range from Vh to Vh+Vc. When a selection is made so that an ink-flying will take place from the conductive end tip part 21*a* by means of coulomb force in the course of its variation, the ink-flying takes place from the conductive end tip parts 21*a* of the electrodes A, forming the ink protrusions 44 by means of Vc application, and ink deposit spots 43 are produced on a recording surface 50*a*.

On the other hand, since the voltage across the conductive end tip parts 21*a* of the electrodes B and the counter electrode 62 is Vh-Vc, it does not meet the condition of ink-flying by coulomb force and also no fluid ink 40 exists, therefore no ink-flying toward the recording surface 50*a* takes place.

As mentioned above, the operation system which modulates the voltage applied across the recording electrodes 21 and the counter electrode 62 substantially by input information, namely Vc and Vc' is useful to obtain very clear boundary between the ink color and white background.

In addition, the fluid ink 40 exists on the edge part of the auxiliary electrodes 12*a* and 13*a*, but the active end faces 12*a* and 13*a* are ground aslant and the distance from the recording surface 50*a* to the auxiliary electrodes 31 and 32 is longer than that from the counter electrode 62 to the conductive end tip parts 21*a*, therefore the field intensity is too weak on the auxiliary electrodes 31 and 32 to cause an ink-flying.

Furthermore, the ink-recording can be made likewise even if the amplitude of Vh is so selected at a larger value than that in the above example irrespective of positive or negative that the ink-flying can be carried out in the state where the ink protrusion, i.e., the fluid ink pattern is formed.

Thus, in the present embodiment, the configuration of the recording electrodes 21 is easy and a high resolution of ink recording with least blur can be made by selecting the ON voltage Vc and the OFF voltage as input information in a reverse-polarity fashion. Hereupon the 'ON voltage' is defined as the voltage by which an ink protrusion is formed and the 'OFF voltage' is defined as the voltage by which the ink protrusion is removed.

In addition, by modulating the amplitude or pulse width of ON voltage Vc by input information, a controlled fluid ink pattern wherein the ink protrusion represents the modulated input information is formed, thereby a multi-tone picture recording can also be made.

The amplitude of the ON voltage (that is, the voltage when the ink printing is made by means of electroosmotic travelling) Vc is determined by the length of the active end faces 12*a* and 13*a*, that is, the distance between the conductive end tip parts 21*a* and the end parts of the auxiliary electrodes 31 and 32, and its suitable value is about 2 V per μm maximum. Normally the above-mentioned distance is suitable to be within about ⅛μm, therefore the amplitude of the ON voltage Vc normally falls within about 40 to 300 V. The voltage Vh is determined by the distance between the conductive end tip parts 21*a* and the counter electrode 62, and this distance is normally about 200 μm, and a paper of about 80 μm in thickness is used for the recording sheet 50 which is a recording medium, thereby the voltage is selected at about 1.7 to 2 KV.

Furthermore, the OFF voltage (that is, the voltage when no printing is carried out by eliminating the ink by means of electroosmotic travelling) Vc' is utilized at a constant voltage amplitude (including zero), but when this amplitude is excessively large, an excessive fluid ink 40 returns to the sides of the auxiliary electrodes 31 and 32 and the porous bodies 121 and 122, thereby the formation of ink protrusion on the conductive end tip parts 21*a* at subsequent application of ON voltage Vc is sometimes delayed.

In order to prevent such delay, it is desired to determine Vc' at a smaller and suitable amplitude in comparison with the maximum amplitude of ON voltage Vc.

Figure 2:
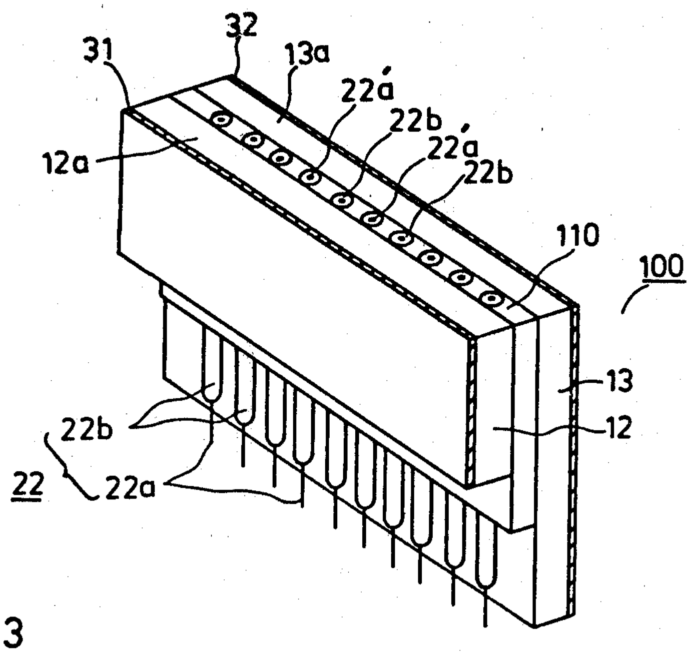
FIG. 2 is a perspective view of a recording head part of the second emodiment of a recording apparatus in accordance with the present invention.

FIG. 2 is a perspective view of a recording head of the second embodiment of a recording apparatus in accordance with the present invention.

In this embodiment, a coated conductors 22 wherein a metallic wire 22*a* is coated with an insulator sheath 22*b* are employed as the recording electrodes corrensonding to FIG. 1. For the metallic wire 22*a*, for instance, a copper wire of 50 to 60 μm in diameter is employed, and for the insulator sheath 22*b*, a dielectric material which causes on electroosmosis of the same polarity as that of the dielectric substance sustrates 12 and 13 and the adhesive 110 with respect to the foregoing fluid ink to be used, for instance, cellulose acetate or glass is used, and its coated thickness is set at about 20 to 30 μm and an arrangement of 3 to 8 wires per mm is adopted.

The dielectric substance substrates 12, 13, the adhesive 110 and the like are constituted like the case in FIG. 1, and exposed conductive end tip parts 22*a*' are formed by grinding the coated conductors 22 together with the active end faces 12*a* and 13*a* of the dielectric substance substrates 12 and 13 facing the recording medium. The porous bodies for feeding the fluid ink to the active end faces 12*a* and 13*a* are disposed respectively on the auxiliary electrodes 31 and 32 like the case in FIG. 1 (illustration is omitted), and the electroosmotic travelling of fluid ink on the active end faces 12*a* and 13*a* are utilized.

Furthermore, the active end faces 12*a* and 13*a* of dielectric substance substrates can also be ground aslant like the case in FIG. 1.

Normally in the ink printer, the arrangement pitch of recording electrodes is required to be made small to improve the resolution of recorded picture, therefore care should be taken about breakdown between them. However, the configuration of the present embodiment prevents such breakdown, thereby has an advantage that the surface areas of the exposed conductive end tip parts 22*a*' can be made larger and a high concentration of ink picture is obtainable. In addition, the recording electrodes can also be constituted by aligning and bonding them onto a thin dielectric substance substitute with two dimensional spread in advance and by inserting and adhering it in between the dielectric substance substrates 12 and 13.

Figure 3:
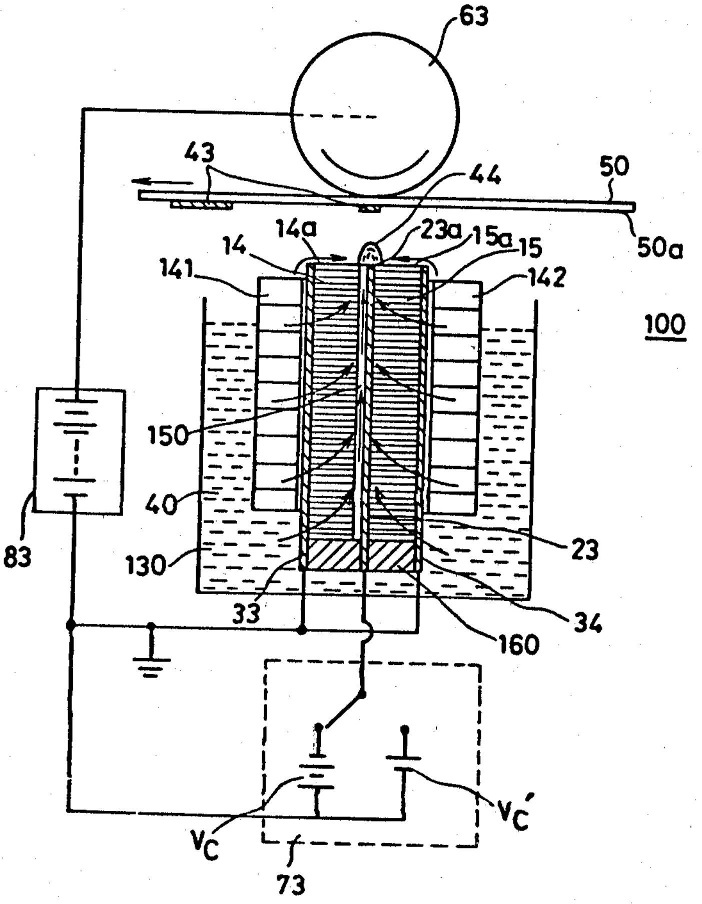
FIG. 3 is a sectional view of the third embodiment of a recording apparatus in accordance with the present invention.

FIG. 3 is a cross-sectional structure view of the third embodiment of a recording apparatus in accordance with the present invention.

In the figure, the dielectric substance substrates 14 and 15 are substancially of porous body having pores or gaps which penetrate through in the direction of width (horizontal direction in the figure), and a microporous membrane filter composed of cellulose acetate or glass filter is employed for the fluid ink as explained about FIG. 1. A filter of 0.8 to 8 μm in mean pore diameter and about 60 to 80% in porosity is preferable. On the surface of one of the porous dielectric substance substrates 14 and 15 (15 side in this embodiment), for instance, recording electrodes composed of conducting paint containing graphite or silver powder 23 printed in parallel in the direction of page depth with a pitch of about 3 to 8 lines per mm as described previously.

On the respective outer surfaces of the porous dielectric substance substrates 14 and 15, for example, auxiliary electrodes 33 and 34 coated with graphite or silver conductive paint and permeable to the fluid ink are attached.

Furthermore, on their surfaces, supporting plates permeable to the fluid ink which are composed of, for example, glass, ceramics, metallic plate or the like and substancially have through holes in the direction of width (horizontal direction in the figure) 141 and 142 are installed, and the porous dielectric substance substrates 14 and 15 are mutually pressed and jointed by a moderate pressure through these plates 141 and 142, and the end parts of them more removed from the recording surface 50*a* of a recording head 100 are immersed in an ink reservoir 130, and the fluid ink 40 is supplied directly to the entire area of the dielectric substance substrates 14 and 15 by means of capillary phenomenon through the supporting plates 141 and 142 and the end parts of the porous dielectric substance substrates 14 and 15.

Active end faces 14*a* and 15*a* of the porous dielectric substance substrates 14 and 15 face the recording surface 50*a* of a recording sheet or medium 50, and a roller-shaped counter electrode 63 in contact with the recording sheet or medium 50 is installed on the top side, that is, the back side of the recording sheet or medium 50. A signal power source 73 is connected between recording electrodes 23 and the auxiliary electrodes 33 and 34 and the ON voltage Vc and the OFF voltage Vc′ based on the input picture signal are selectively applied corresponding to input picture signal to be recorded and reproduced. Also, the high voltage Vh is applied across a counter electrode 63 and the auxiliary electrodes 43 and 44 from a high voltage power source 83 like the case in FIG. 1.

The operation in FIG. 3 is explained on the case where, for example, a material wherein electroosomotic travelling takes place in the direction of negative electrode is used as the fluid ink 40 like the case in FIG. 1.

When the ON voltage Vc is applied, the fluid ink 40 makes electroosomotic travelling as shown by the arrow marks in the figure from the end parts of the auxiliary electrodes 33 and 34 toward exposed conductive end tip parts 23*a* respectively at the active end faces 14*a* and 15*a* of the porous dielectric substance substrates 14 and 15.

Furthermore, in the direction of thickness of the porous substance substrates 14 and 15, as exemplified by the arrows, electroosmotic travelling is made from the auxiliary electrodes 33 and 34 toward the recording electrodes 23 and the ink flows into the contacting gap 150 between the electrodes 23 and the dielectric substance substrate 14. Since an anti-backflow seal 160 sealed with an adhesive or the like is present at the end of opposite side to the recording surface 50*a* of the recording head 100 (bottom end part in the figure), the abovementioned fluid ink 40 is carried as shown by the arrow marks in the direction toward the exposed conductive end tip parts 23*a* by the abovementioned electroosmotic pressure through the contacting gap 150. In this case, the arrow marks show schematically that the ink travels upward through the gap in the central part from the right- and left-hand supporting plates 141 and 142, but practically, the travelling does not always follow such curved arrow marks aligned in parallel.

From this ink carried by pressure and the foregoing ink through the active end faces 14*a* and 15*a*, ink protrusions 44 are formed on the exposed conductive end tip parts 23*a*, and furthermore caused to fly onto the recording surface 50*a* to produce ink deposit spots 43.

On the other hand, in the state where the OFF voltage Vc′ is applied, the fluid ink 40 travels by electroosmosis in the reverse direction to arrow marks in the figure, thereby the ink protrusion disappears. Accordingly, no ink deposit spot is produced.

Thus, the recording of ink picture at a concentration corresponding to the amplitude of the ON voltage Vc can be made, and when compared with the case in FIG. 1, even pores inside the porous dielectric substance substrates 14 and 15 can participate in effective formation of ink protrusion by also utilizing the electroosmotic travelling in the direction of thickness (horizontal direction in the figure), therefore a high sensitivity of picture recording can be carried out and also this has an advantage of ink recording of high resolution because the fluid ink 40 always gathers in a concentrated fashion at the exposed conductive end tip parts 23*a* (top end part) where the ON voltage Vc is applied.

Figure 4:
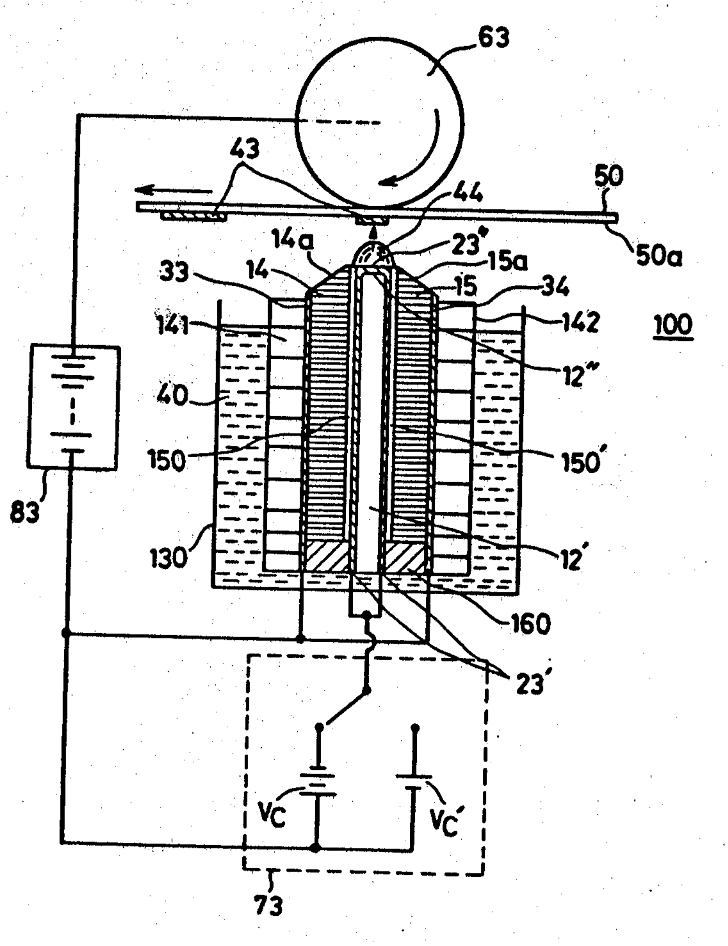
FIG. 4 shows a cross-sectional structure of the fourth embodiment of a recording apparatus in accordance with the present invention.

FIG. 4 is a cross-sectional structure view of another embodiment of a recording apparatus in accordance with the present invention.

In this type of ink printer, the width of the recording electrode, that is, the number of recording electrodes per unit length determines the resolution, and the thickness thereof determines the amount of ink protrusion, that is, the recording concentration.

Accordingly, in order to obtain a high resolution of and a high concentration of recording, it is desirable that recording electrodes with high precision, narrow width, and large thickness can be easily constituted.

In a configuration in FIG. 3, since the recording electrodes 23 are made by coating a conductive paint directly on the surface of the porous dielectric substance substrate, care should be taken about securing coating precision thereof and expansion and contraction of the porous dielectric substance substrate in use, and it is sometimes difficult to secure a sufficient thickness.

The present embodiment is intended to improve the abovementioned difficulties. A thin dielectric substance substrate with plate-shaped or film-shaped two-dimensional spread 12′ is installed which causes electroosmotic travelling in the same polarity direction as the porous dielectric substance substrates 14 and 15 with respect to the fluid ink 40.

Recording electrodes 23′ are attached to the both surfaces and a top end face 12″ of the substrate 12′ with required width and pitch.

The length of an exposed conductive end tip part 23″ at the end face 12″, that is, the thickness of the dielectric substance substrate 12′ is to determine the thickness of the recording electrodes 23′ and is arbitrarily adjustable by adequately selecting the thickness of the substrate 12′.

Also, since a non-porous and rigid substance is employed for the dielectric substance substrate, the width and pitch of the recording electrode 23′ can be formed with high precision by utilizing the photoetching technique. In addition, this dielectric substance substrate 12′ plays a role of a supporting substrate of the porous dielectric substance substrates 14 and 15, therefore even if a plastic microporous membrane filter is used, a recording head part with particularly greater mechanical strength of the end face part 23″ unlike the case in FIG. 3 and with less expansion and contraction can be constituted.

For the abovementioned fluid ink 40, for instance, boro-silicate glass, silica glass plate, or cellulose acetate film can be employed as a material of the dielectric substrate 12'. After a metal oxide film such as indium oxide, tin oxide or the like, or a metallic foil such as conductive paint-coated film, copper or the like is coated on the surface as a conductive material for the recording electrodes 23', the parallel-stripe-shaped recording electrodes 23' insulated from one another by the photoetching method is fabricated.

For example, a head for ink recording of about 8 lines/mm is fabricated as follows. A thin glass plate of 30 to 50 μm in thickness is employed for the dielectric substance substrate 12', and the recording electrodes 23' are constituted with a width of 50 to 60 μm and a pitch of 125 μm.

The formation of ink protrusion by means of pressure-feeding of the fluid ink 40 by the ON voltage Vc from the auxiliary electrodes 33 and 34 sides to the exposed conductive end tip parts 23", and the elimination of the ink protrusion 42 by means of suck-up in the reverse direction of the abovementioned by the OFF voltage Vc' of reverse polarity of Vc is carried out by means of electroosmotic travelling through active end faces 16 and 16' of the porous dielectric substance substrates 14 and 15, and by means of protrusion by pressure-feeding and suck-up of ink through a contacting gap 150 (a gap between the porous dielectric substance substrate 14 and the dielectric substance substrate 12') and a contacting gap 150' (a gap between the porous dielectric substance substrate 15 and the dielectric substance substrate 12').

Furthermore, a material for the porous dielectric substance substrates 14 and 15 and the dielectric substance substrate 12' is so selected that these substrates will cause electroosmotic travelling in the same polarity direction with respect to the fluid ink 40.

Furthermore, in the above description, when the exposed conductive end tip parts 23" on the top end surface of the active end face are cut at the center, thereby being used as separate right- and left-hand recording electrodes opposed to and independent from each other 23' and 23', operation can also be carried out likewise.

In this case, operation may be carried out in such a manner that in addition to an arrangement wherein two conductive parts are opposed to and independent from each other on the both surfaces of the dielectric substance substrate 12' as described above, the arrangement of recording electrodes on the front face of the substrate 12' is shifted from that on the back face by a half pitch and front- and back face electrodes are used as independent recording electrodes and then separate signals Vc and Vc' are applied to these electrodes. Application of this method doubles the arrangement density of the recording electrodes 23' equivalently, thereby being useful for obtaining a high resolution of recording.

Furthermore, in a configuration that the front- and back-recording electrodes operate selectively in the state that they are opposed and independent or furthermore phase-shifted as mentioned above, an advantage that the recording of two-color ink picture can be made by a single recording head is given by providing a means of suppling fluid inks of different color to the porous dielectric substance substrates 14 and 15 respectively through the auxiliary electrodes 33 and 34 respectively.

In such case, the ink reservoir 130 is divided into two (right and left) ink reservoirs. Since the porous dielectric substance substrates 14 and 15 are separated from each other by the dielectric substance substrate 12', a color-mixing of the ink 40 can be prevented. However, the two-color mixing sometimes happens on the top active end face 12".

In such case, a problem of color-mixing can be solved by at least either the method that the end part of the dielectric substance substrate 12' where the recording electrodes are installed is so shifted toward the recording medium 50 as to protrude a little over the active end faces of the porous dielectric substance substrates 14 and 15, or the method that a material which prevents wetting by the fluid ink 40 and repels the fluid ink 40, for instance, an ink repellent such as polymer of fluorine family is coated on the top face center line of the side active end face 12".

Such multi-color recording method has an advantage that a color picture ink recording can be realized with the fluid inks 40 of different color, (cyan, magenta, yellow and black) by disposing two recording heads 100 with an appropriate clearance.

Furthermore, in the present embodiment, in place of the structure wherein the recording electrode 23 is installed on both surfaces of the dielectric substance substrate 12', like the case in FIG. 2, conductive wires such as metal which are covered with insulator are arranged in parallel between the porous dielectric substance substrates 14 and 15, and can be employed as recording electrodes. In the present embodiment, tapered active end faces **14*a* and 15*a* are provided, but such face tapering can be omitted as required as shown in FIG. 3**.

Furthermore, the above embodiment exemplifies the case employing OFF voltage Vc', and the amplitude of this OFF voltage may be zero as required, and may be a constant amplitude of the same polarity as Vc and appropriately smaller than that of Vc.

The two-dimensional picture recording can be made by means of line sequential recording with plural recording electrodes arranged. However, in the case of the point sequential recording or the like, a configuration can be made even with a single recording electrode. In addition, in the case of the point sequential recording, a crisp, that is, blurless ink recording can also be achieved by constituting with three recording electrodes and applying signal voltage to the middle recording electrode while always applying the OFF voltage Vc' to both side recording electrodes.

Furthermore the above-mentioned various configurations can be employed by suitably combining them as required.

The above-mentioned recording apparatus requires an application of high voltage because the ink-flying must be made by means of coulomb force. However, a recording apparatus of low voltage operation utilizing no coulomb force can be realized when an ink transcription by means of contacting with a recording medium is utilized.

To describe more concretely, in this recording apparatus, an ink protrusion, that is, a state that a fluid ink representing input information is energized corresponding to an input signal is formed by electroosmotic travelling of the fluid ink by means of application of signal voltage representing the input information to the recording head having a means of supplying the fluid ink, holding this ink, and having dielectric substance substrates which cause electroosmotic travelling, and the ink transcription is made by contacting this ink protrusion with a recording medium, thereby an ink picture corresponding to the input signal is recorded and reproduced on this recording medium. Hereupon, the protrusion means a state that the amount of ink in some area is relatively large against a deenergized state that the ink is almost removed.

Furthermore, this apparatus is characterized in that this has a recording head which has a fluid ink, dielectric substance substrates holding this ink and causing electroosmotic travelling, and a pair of electrodes applying a voltage to this compound body on a supporting substrate, and an electroosmotic travelling of the fluid ink is made through the above-mentioned dielectric substance substrates by applying signal voltage representing input information across these electrodes, thereby a fluid ink protrusion pattern representing the input information is formed on an end edge part or its vicinity of the above-mentioned supporting substrate, and the above-mentioned protrudent fluid ink pattern is transferred to a recording medium by contacting the recording medium with this end edge part, thus an ink picture corresponding to the input signal is recorded and reproduced on the above-mentioned recording medium.

Hereupon, the fluid ink, as its configuration exa-ples were already described, is defined as a colored substance wherein a dye or a pigment is dissolved or suspended in a liquid, having fluidity irrespective of its form; solution or colloid.

Furthermore, the electroosmosis is a general designation of the boundary surface electrokinetic phenomenon that when a liqueous material becomes in contact with a solid, electric double layers are generated on their boundary surface, and the liqueous material moves in relation to the solid with a voltage applied. The movement of the liqueous material is made along the surface of solid material when the solid material is non-porous, and the movement is made along the solid surface and or through the inside of solid when the solid material is porous.

Figure 5:
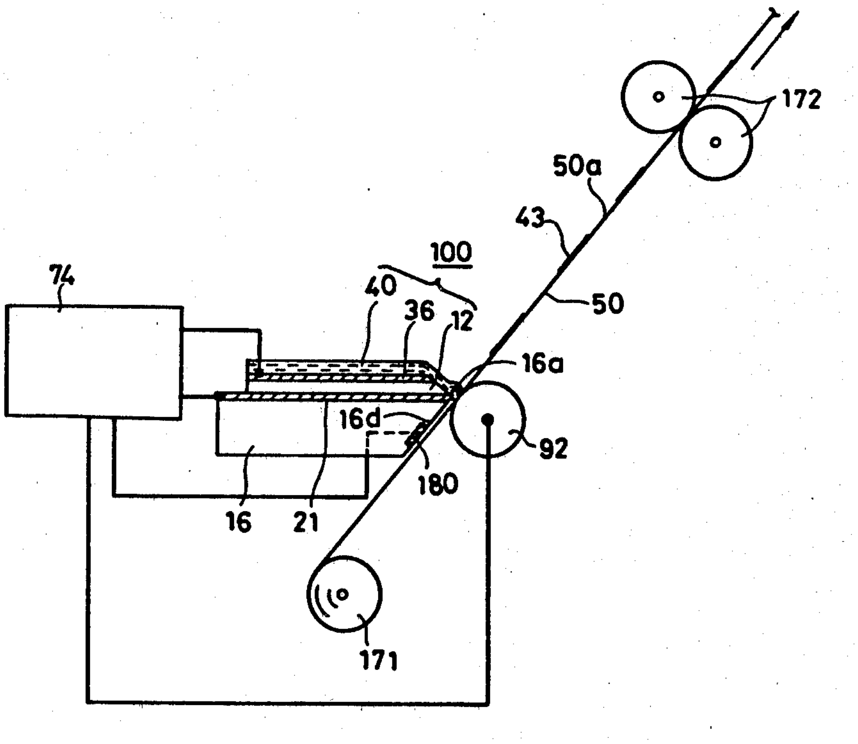
FIG. 5(A) is a cross-sectional view of the fifth embodiment of a recording apparatus in accordance with the present invention.
FIG. 5(B) is a perspective view of FIG. 5(A).
Figure 5B:
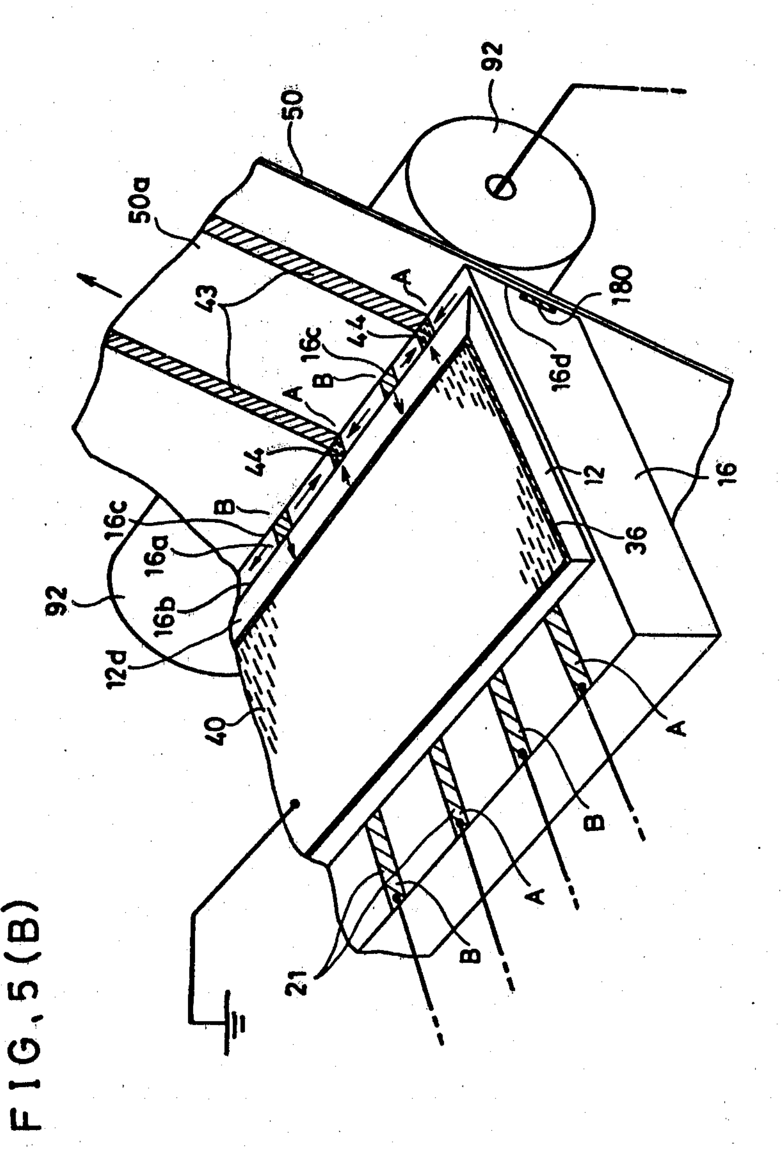

FIG. 5(A) and FIG. 5(B) are based on the above-mentioned principle and show a cross-sectional structure view and a power supply system of the fifth embodiment of a recording apparatus in accordance with the present invention.

Figure 6:
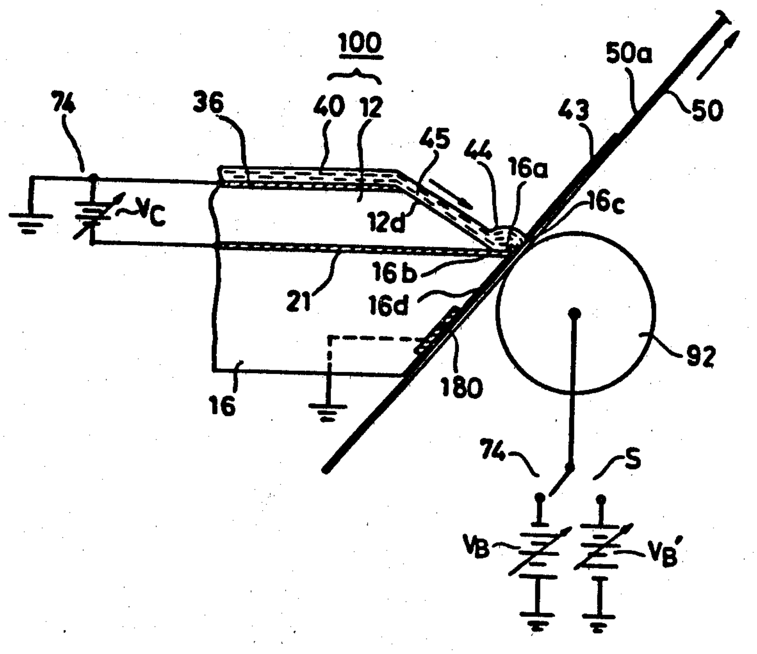
FIGS. 6(A) and 6(B) are explanatory views of operational principle for an apparatus as shown in FIG. 5(A) and FIG. 5(B).
Figure 6:
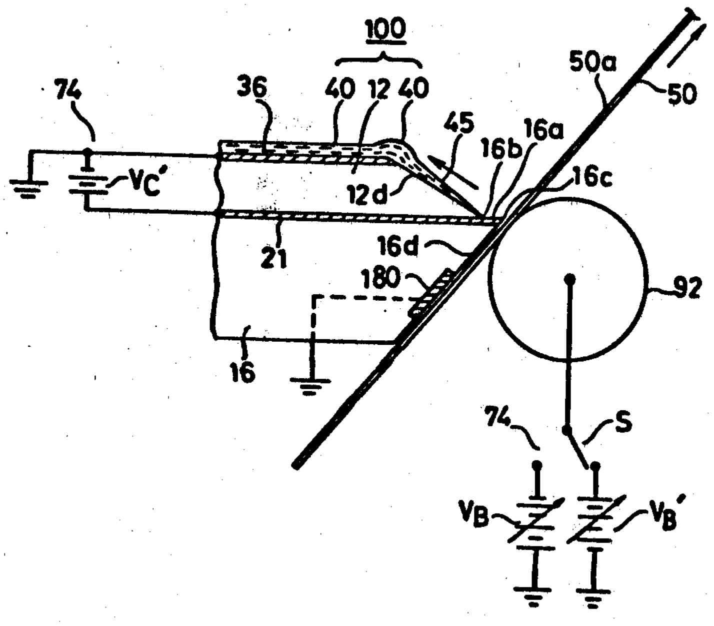

FIG. 6(A) is an explanatory view of operational principle of a recording apparatus in FIG. 5(A) and FIG. 5(B) in the case where an ink printing is made when the ink protrudes and FIG. 6(B) shows the case where no printing is made.

Figure 12:
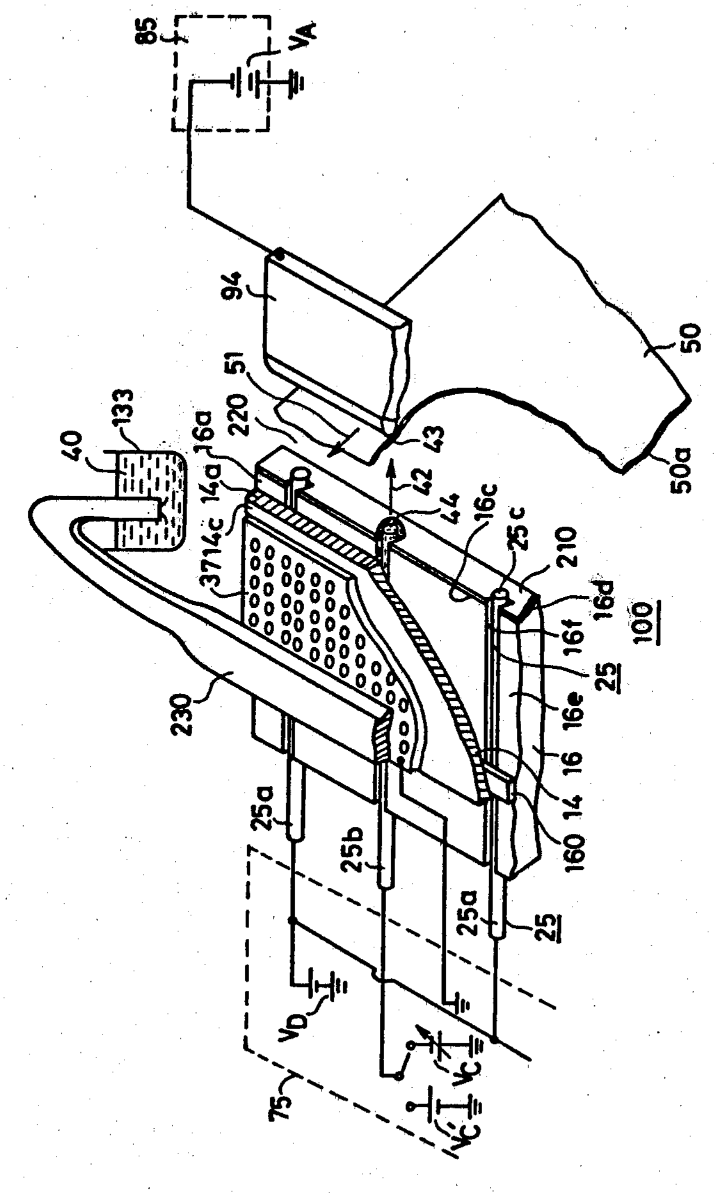
FIG. 12 is a perspective fragmental view of the tenth embodiment of a recording apparatus in accordance with the present invention.

In FIG. 5(A) and FIG. 5(B), 12 is a dielectric substance substrate of about 20 to 150 μm in thickness comprising thin layer or thin plate of plastic, glass or the like, and 40 supplied to and disposed on the substrate 12 is a fluid ink making electroosmotic travelling with respect to this dielectric substance substrate, and 12 and 40 and the like form a recording substrate 12 is constituted with, for example, boro-silicate glass or cellulose acetate, the fluid ink as described in the embodiment in FIG. 1 can be used as the fluid ink 40 showing good electroosmotic proterty in the direction toward a negative electrode with respect to this dielectric substance substrate 12. 16 is a plate-shaped supporting substrate such as plastic, glass or the like, on the surface of which recording electrodes 21 are attached. The above-mentioned dielectric substance substrate 12 is adhered and joined to the supporting substrate 16 in such a manner that each one edge end is shifted from each other by about 50 to 200 μm with these electrodes 21 inserted between them, thereby an auxiliary active end face **16*a* is formed at the end part of the supporting substrate 16**.

In this case, when the dielectric substance substrate 12 is of glass or the like and necessitates an adhesive, it is preferable that the electroosmotic polarity of the adhesive with respect to the fluid ink 40 is the same as that of the dielectric substance substrate 12, and cellulose acetate is suitable in the above-mentioned fluid ink configuration. An auxiliary electrode 36 is attached on the opposite surface to the recording-electrode-arranged surface of the dielectric substance substrate 12, and the above-mentioned fluid ink 40 is disposed on this auxiliary electrode.

The electrodes 21 and 36 can be constituted with a metal such as copper, silver, gold or the like or with a thin film or thin plate of metal oxide such as tin oxide, indium oxide or the like. However, from the standpoint of preventing electrochemical erosion, a configuration with graphite, silver conductive paint or the like is preferable.

The configuration is made in such a manner that one or both of the dielectric substance substrate 12 and the supporting substrate 16 are tapered toward an edge end **16*b* of the active end face 12*d* or an end edge part 16*c*, and these side end faces 12*d* and 16*d* or their extended faces intersect with each other. Together with an installation of an auxiliary active end face 16*a*, this tapering prevents an instability of electroosmotic travelling of an ink 45 due to a wiping-out of the ink 45 on this end face 16*d* caused by a contact of a recording surface 50*a* on a recording sheet or medium 50 with the side end face 16*d*. Therefore this configuration is preferable to transfer the fluid ink 40 corresponding to the signal voltage as described later onto the recording surface 50*a*. The present embodiment exemplifies the case where the respective active end face 12*d* and side end face 16*d* of the dielectric substance substrate 12 and the supporting substrate 16** are ground aslant and tapered together.

Furthermore, in the present embodiment, the auxiliary active end face **16*a* is constituted in such a manner that the end edge part 16*c* of the supporting substrate 16 supporting the recording electrodes 21 extends a little beyond the end edge 16*b* of the active end face 12*d*. An advantage of the configuration with the auxiliary active end face 16*a* is that the protrusion 44 of the liquid ink 40 can be formed effectively on this end face 16*a***.

50 is the recording sheet or medium such as paper, plastic or the like, which is fed from a sheet winding roller 71 in the direction as shown by the arrow mark by means of feed rollers 172, and fed along the side end face **16*d* of the supporting substrate 16 and a charge eliminating electrode 180 and made to contact with the end edge part 16*c* by means of a press roller 92**.

A source of input electric signal to be ink-recorded applies the electric signal Vc across a pair of electrodes 21 and 36, and concurrently supplies the press roller 92 which also serves as a counter electrode with the bias voltage $V_B$.

Hereinafter, operation is elucidated on the example where the fluid ink 40 which makes electroosmotic travelling in the direction toward a negative electrode as mentioned above.

Consideration is made on the case where the ON voltage Vc negative with respect to the auxiliary electrode 36 is applied to the recording electrodes 21, as shown in FIG. 6(A). The active end face 12d of the dielectric substance substrate 12 is supplied with the fluid ink 45 so as to get wet by the fluid ink 40. The interface electric double layers are produced on this active end face 12d, and the active end face 12d side shows a negative electric behavior, and the fluid ink 45 side a positive electric behavior. Accordingly, as mentioned above, when the voltage Vc is applied, the fluid ink 45 moves, that is, makes electroosmotic travelling from the positive electrode 36 side to the negative electrodes 21 side through the active end face 12d by means of this electric field as examplified by the arrow mark. A deficient amount of this fluid ink 45 which has moved by this electroosmotic travelling is automatically supplied from the fluid ink 40 on the electrode 36 by means of surface tension.

Accordingly, by this electroosmotic travelling, the fluid ink 45 gathers on the end edge of the active end face 12d, and further on the auxiliary active end face 16a and forms the ink protrusion 44, that is, an energized state, corresponding to the amplitude of the Vc applied. This protrudent fluid ink 44 is deposited and transfered by contacting onto the recording surface 50 of the recording sheet or medium 50 which is pressed onto the end edge part 16c. When the recording sheet 50 is moved by the above-mentioned rollers as shown by the arrow mark, an ink transcription 43 with light and shade corresponding to the amplitude of the negative voltage Vc is obtained on the recording face 50a.

On the other hand, when the OFF voltage Vc', zero or positive with respect to the auxiliary electrode 36, is applied to the recording electrodes 21 as shown in FIG. 6(B), an electroosmotic travelling of the ink 44 toward the end edge 16b of the active end face 12d as shown in FIG. 6(A) stops. Particularly, when a positive voltage, that is, the OFF voltage Vc is applied, the direction of electroosmosis is reversed instantaneously as shown by the arrow mark, and the fluid ink 45 moves from the end edge part 16c where the recording electrodes 21 being positive electrodes are located toward the auxiliary electrode 36 being a negative electrode, thereby the fluid ink protrusion 44 disappear instantaneously and no ink transcription is produced.

Thus, when a voltage zero or negative with respect to the electrode 36 is applied as the voltage for ink supply and transcription Vc and a signal which is positive voltage and contains input information is applied as the voltage for preventing ink supply and transcription Vc' respectively to the recording electrodes 21, an ink transcription 43 with light and shade corresponding to the amplitude of Vc is obtainable. When a plural number of recording head elements as mentioned above are arranged in a row parpendicular to the running direction of the recording paper and these elements are operated selectively, a two-dimensional ink picture can be recorded.

When a material which makes electroosmotic travelling toward a positive electrode is used as the fluid ink 40, the above-mentioned recording can be carried out likewise with the polarities of Vc and Vc' reversed to the above-mentioned polarities.

The electroosmotic coefficient U for the fluid ink 40 normally obtainable is about $10^{-6}$ to $10^{-4}$ cm$^2$/V·sec when the distance L between the auxiliary electrode 36 and the recording electrodes 21 (length of the active end face 12d in the present embodiment) is expressed in cm unit, applied voltage in volt (V), and time in second (sec). The applied voltage can be raised up to about 2 V/μm (or $2\times10^4$ V/cm) maximum, therefore when an ink of high mobility is used as a luid ink 20, electroosmotic travelling can be made at a rate of about two cm per sec. Since one-dot ink transcription requires an electroosmosis of about 10 μm, a high speed recording of about $10^3$ dots per sec becomes obtainable. In addition, L is normally selected at about 20 to 150 μm, therefore the maximum amplitude of Vc becomes about 40 to 300 V.

In the case where an ink-flying by means of coulomb force is utilized in a similar ink printer, a high voltage of about 2 KV is required for an ink-flying, whereas a recording apparatus of the present invention can be operated at a far lower voltage.

In addition, since the ink contacting transcription is employed, there is no need of keeping the clearance between the recording paper and the recording electrodes. Therefore this apparatus has an advantage that the configuration can be simplified to a large extent.

Furthermore, in the method of direct ink transcription like the present invention, care should be taken about an electric behavior of the recording medium. Generally, an insulator such as paper or the like is often used for the recording sheet or medium 50 and is electrified by friction electricity or the like, thereby the transcription of the protrudent ink 44 sometimes become unstable due to this electric field. In order to prevent this phenomenon, a means of removing charge on the recording surface prior to the ink transcription has only to be provided.

One example of this means is as follows: As examplified in FIG. 5(A), FIG. 5(B), FIG. 6(A) and FIG. 6(B), an electrode 180 is installed on the side end face 16d or the press roller is made metal, and they are grounded or biased at a certain potential through an electric signal source 74, thereby a charge on the recording surface 50a of the recording sheet 50 in contact with them or the surface of opposite side is discharged or they are charged at a certain potential. Thus the charge on the recording surface 50a, that is, a two-dimensional uneven distribution of potential is prevented, thereby the ink transcription can be made stable.

Furthermore, as shown in FIG. 5(A), FIG. 5(B), FIG. 6(A) and FIG. 6(B), the press roller is made of conductor and serves as a counter electrode, being supplied from the electric signal source 74. By giving a potential difference to this roller 92 with respect to the recording electrodes 21, the transcription of the ink protrusion 44 to the recording surface can be controlled.

For example, in FIG. 6(A), when a negative voltage $V_B$ with amplitude larger than Vc is applied to the press roller 92 through the switch S, an electroosmotic travelling 45 toward the end edge part 16c through the active end face 12d is accelerated by this static electric field. On the other hand, when a negative voltage $V_B$ with amplitude smaller than the above-mentioned or a positive voltage $V_B'$ selected by the switch S is applied, the electroosmotic travelling 45 toward the end edge part is suppressed, thereby the formation of the ink protrusion can be controlled. The ink protrusion 44 is electrified corresponding to the potential difference between the recording electrode 21 in contact with this and the press roller 92 and attracted toward the press roller 92 or the recording surface 50a side by a coulomb force corresponding to this potential difference, thereby facilitates the ink transcription 43.

Therefore, a transcription of high concentration and high speed is obtainable by applying a negative voltage $V_B$ with amplitude larger than Vc in synchronization with Vc. Normally, the amplitude of the voltage $V_B$ in this case is selected, for example, at 1000 V or less when a paper of 50 to 80 m in thickness is used for the recording sheet or medium 50, therefore this method may employ a lower voltage than that in the conventional inkjet method utilizing the flying of ink drops in an air between the recording electrode and the recording medium.

Normally, when the effect given by the static electric field of the transfer roller 92 as a counter electrode upon the electroosmotic travelling on the active end face **12*d* is compared with that given by the coulomb force upon the ink protrusion 44, the latter is often predominant. Accordingly, in such case, as shown in FIG. 6(B), in the state of application of the OFF voltage Vc' for preventing the ink transcription, a positive voltage $V_B'$ with amplitude nearly equal to that of Vc' is applied to the press roller 92 through the switch S, thereby the potential difference between the recording electrodes 21 and the press roller 92 is made zero. This means prevents an effect of coulomb force upon the ink protrusion 44, thereby being effective for preventing the ink transcription. Therefore this means is preferable for a picture recording of high speed and high resolution. As mentioned above, this means has an advantage that a variable control can be made made which accelerates or suppresses the transcription by applying the positive and negative voltages $V_B$ and $V_B'$ as bias voltages to the press roller 92 which is a counter electrode in correlation to the potential of the recording electrodes 21**, or by varying their amplitude or polarity, or by applying them in synchronization with the Vc or Vc', or applying the $V_B$ and $V_B'$ selectively to the printing head when the recording apparatus is constituted with a plural number of these printing heads.

When the fluid ink 40 which makes electroosmotic travelling toward a positive electrode is used, this means can also be applied likewise in view of the voltage polarity.

Figure 7:
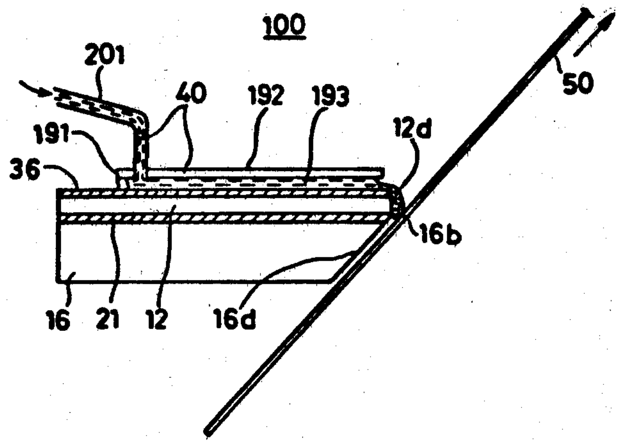
FIG. 7 is a cross-sectional structure view of the sixth embodiment of a recording apparatus in accordance with the present invention.

FIG. 7 is a cross-sectional structure view of the sixth embodiment of a recording apparatus in accordance with the present invention.

In this embodiment, only the supporting substrate 16 is tapered aslant, and the end part of the dielectric substance substrate 12 is not tapered aslant.

The recording sheet 50 is constituted by pressing to and contacting with the end edge **16*b***.

The supply of the fluid ink 40 to the surface of the dielectric substance substrate 12 on which the auxiliary electrode 36 is provided is carried out in such a manner that an auxiliary plate 192 fixed with a spacer 191 is installed, for example, with a gap of about 20 to 200 μm between it and the auxiliary electrode 36 and with the position equivalent to the end edge part **16*b* left, and the fluid ink 44 is supplied to a gap 193 between this auxiliary plate 192 and the auxiliary electrode 36 from outside through a ink feeding pipe 201**.

Figure 8:
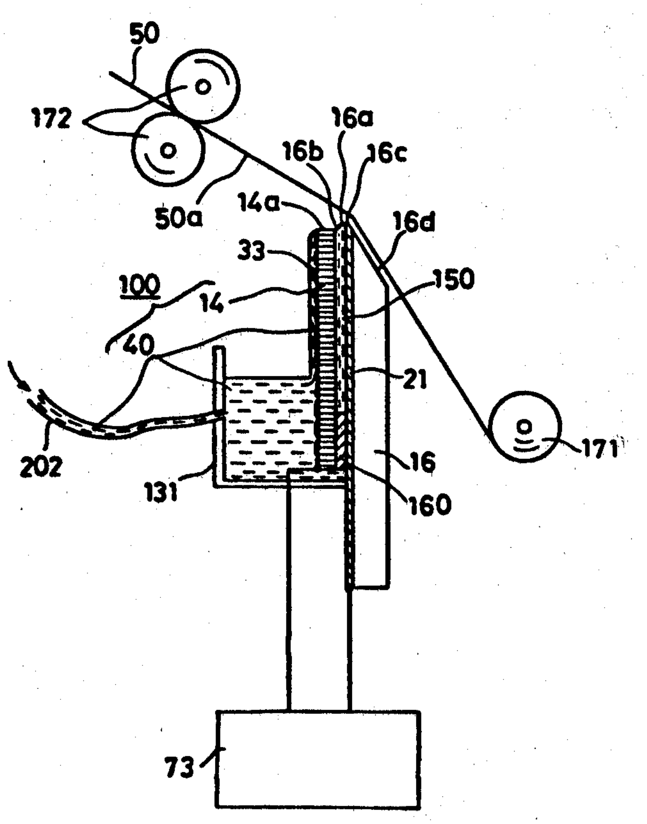
FIG. 8 is a cross-sectional view of the seventh embodiment of a recording apparatus in accordance with the present invention.

FIG. 8 is a cross-sectional structure view of the seventh embodiment of a recording apparatus in accordance with the present invention.

In this embodiment, a sheet-shaped porous dielectric substance substrate 14 similar to the one as explained in FIG. 3 which has fine gaps or pores substantially penetrating through in the direction of thickness is employed as a dielectric substance substrate and the fluid ink 40 is fed to and impregnated into this substrate.

The porous dielectric substance substrate 14 is constituted, for instance, with natural fiber, glass, ceramics, plastic material or the like, and its thickness is selected at, for instance, about 20 to 150 μm.

A particularly good quality of picture recording can be carried out by employing a so-called microporous membrane filter comprising plastic material with mean pore diameter of 0.1 to 8 μm and pore factor of about 60 to 80%.

When the electroosmotic ink 40 as previously described is employed, a microporous membrance filter comprising cellulose acetate is very suitable.

Such porous dielectric substance substrate 14 is disposed on the supporting substrate 16 such as glass plate or the like coated with the recording electrodes 21, and its portion remote from the end edge **16*b* is bonded to the supporting substrate 16 having the recording electrodes 21 by means of an adhesive 160 to prevent a backflow of the fluid ink 40. An auxiliary electrode 33 permeable to the fluid ink is installed on the surface of the porous dielectric substance substrate 14 being opposite side to the recording electrodes 21. The auxiliary electrode 33** can be formed by thinly coating a conducting paint containing graphite, or coating a net-shaped metal electrode or the like.

The opposite side to an active end face **14*a* of the porous dielectric substance substrate 14 is immersed into a ink reservoir 131 thereto the ink 40 is supplied through an ink feeding pipe 202, and the fluid ink 40 osmoses through the auxiliary electrode 33 and is impregnated into the porous dielectric substance substrate 14** by means of capillary phenomenon.

The input voltage for recording is supplied to the electrodes 21 and 33 from the power source 73.

Both the end faces **14*a* and 16*d* of the porous dielectric substance substrate 14 and the supporting substrate 16 may be tapered aslant together, but in this embodiment, only the active end face of the supporting substrate 16*d* is tapered, and the recording surface 50*a* of the recording sheet or medium is made to contact with the end edge part 16*c* by means of the rollers 171 and 172**.

Figure 9A:
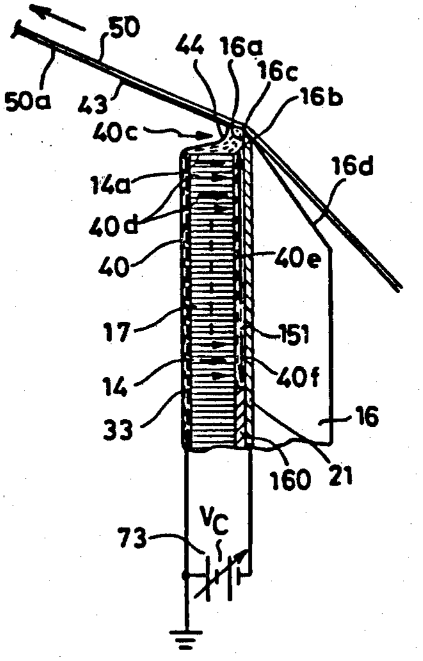
FIGS. 9A and 9B are explanatory views of operation of an apparatus as shown in FIG. 8.
Figure 9B:
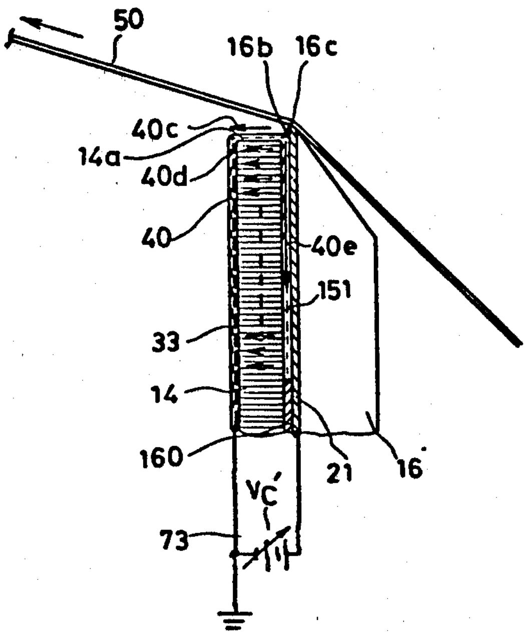

FIG. 9(A) and FIG. 9(B) are explanatory views of operation of a recording apparatus in FIG. 8. Also in this embodiment, elucidation is made conveniently in reference to the case where the above-mentioned fluid ink which makes electroosmotic travelling toward a negative electrode like the case in FIG. 5(A) and FIG. 5(B).

In FIG. 9(A), the ON voltage Vc for ink supply and transcription negative with respect to the auxiliary electrode 33 is applied to the recording electrode as the signal voltage causing electroosmotic phenomenon which makes the fluid ink 40 travel from the auxiliary electrode 33 toward the recording electrodes 21 as shown by the arrow marks.

Then, the fluid ink 40 adhering to or impregnated into the porous dielectric substance substrate 14 makes electroosmotic travelling toward the end edge **16*b* on the side active end face 14*a* as shown by the arrow mark 40*c* like the case in FIG. 5(A) and FIG. 5(B). Concurrently, electroosmotic travelling is made over the entire dielectric substance substrate 14 from the auxiliary electrode 33 side to the recording electrodes 21 side through fine pores or gaps 17** substantially penetrating through in the direction of thickness.

The fluid ink 40 travelling by this electroosmosis in the direction of thickness flows into a contacting gap 151 between the dielectric substance substrate 14 and the supporting substrate 16 having the recording electrodes 21 and fills it, and also it is pushed out to the end edge 16*b* by an electroosmotic pressure as shown by the arrow mark 40*e* in the figure.

No push-out of the fluid ink 40 toward opposite side to the end edge 16*b* as indicated by the arrow mark 40*f* can take place when a means of preventing a movement of the fluid ink 40 is provided by sealing with the adhesive 160 or by pressing this portion of dielectric substance substrate 14 onto the supporting substrate 16 side.

Accordingly, the fluid ink 40 making electroosmotic travelling in the direction of thickness as indicated by the arrow 40*d* is effectively carried by pressure and oozes out on the end edge 16*b* side. For this reason, combined with the electroosmotic travelling on the above-mentioned side active end face 14*a*, this travelling effectively forms the fluid ink protrusion 44 on the auxiliary active end face 16*a* ranging from the end edge 16*b* to the end edge part 16*c* and produces the ink deposit spot 43 by contacting transcription on the recording surface 50*a*.

Furthermore, in this case, the fluid ink 40 is filled in excess in the contacting gap 151 by an electroosmotic travelling in the direction thickness, and by this pressure, the porous dielectric substance substrate 14 is sometimes raised up, thereby an effective oozing-out is reduced. In such case, the auxiliary substrate is disposed on the surface of the auxiliary electrode 33, and the porous dielectric substance substrate 14 is pushed onto the recording electrodes 21 side with a moderately weak pressure. By doing so, not only the above-mentioned problems can be solved, but also an advantage is given that the pressure-feeding and oozing-out of the fluid ink 40 through the contacting gap 151 can be carried out more effectively. The auxiliary substrate may be of non-permeance to liquid, however, an auxiliary substrate having a number of fine pores and permeable to liquid is advantageous in view of ink supply.

Unlike the embodiment in FIG. 5(A) and FIG. 5(B), in the operation as shown in FIG. 9, the ink protrusion 44 is formed by utilizing the electroosmotic travelling of entire dielectric substance substrate the direction of thickness in addition to the electroosmotic travelling on the active side end face.

Therefore, the present embodiment has an advantage that a far effective ink transcription 43 can be carried out. The concentration of ink transcription 43 can also be controlled by varying the amplitude or/and the application time of the ON voltage Vc.

For stopping an ink transcription, the amplitude of Vc has only to be made zero, or the OFF voltage Vc′ of reverse polarity to Vc for preventing the ink transcription has only to be applied as shown in FIG. 9(B).

Figure 10:
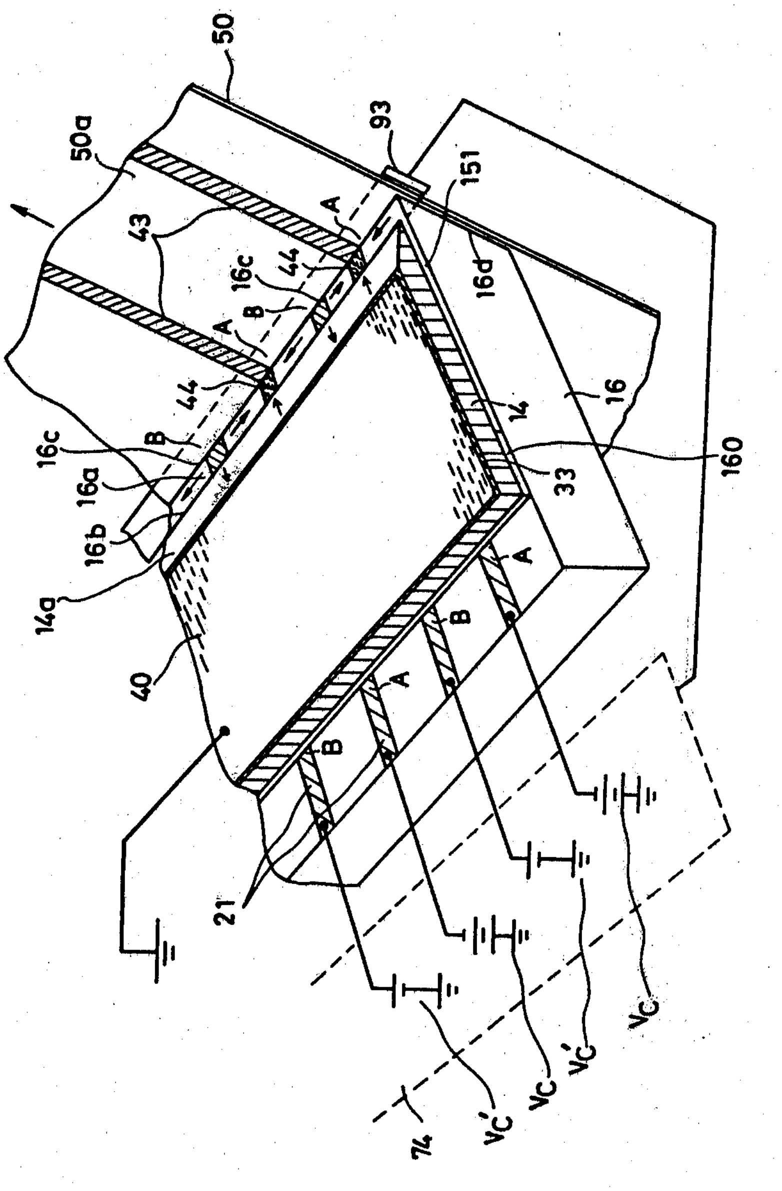
FIG. 10 is a perspective view of the eighth embodiment of an apparatus in accordance with the present invention.

FIG. 10 is a fragmental perspective view of the eighth embodiment of a recording apparatus in accordance with the present invention.

An ink picture recording is made in such a manner that the recording electrodes 21 are insulated from one another and a plural number of recording electrodes are arranged in a parallel grate fashion as shown in the figure. The resolution of recording picture is determined by this arrangement pitch. Normally this arrangement pitch is preferable to be about 333 to 126 μm (3 to 8 lines/mm), and the width of the conductive part of the recording electrode 21 is selected at about 50 to 70 μm. This kind of recording electrode 21 is fabricated with a conductive paint such as graphite, silver or the like, metal evaporation film, metal oxide conductive film, metal foil, or the like separated in a parallel grate fashion by the photoetching method disclosed to the public.

These recording electrodes 21 are connected to the input signal source 73 or 74 and input signal voltage is selectively applied by means of line sequencial, time sequential, or furthermore multiplex operation.

Corresponding to this input signal voltage, the protrusion by the fluid ink 40 or a highly dense ink amount part 44 is formed by an electroosmosis which passes through the porous dielectric substance substrate 14 in the direction of thickness and then travels through the contacting gap 151 toward the recording electrodes 21 and by an electroosmosis which travel along the surface of the auxiliary electrode 33, the active end face 14*a* and the end edge 16*b* toward the end edge part 16*c*, thereby the ink transcription 43 onto the recording surface 50*a* is carried out.

For recording a good quality of picture, the blur of the fluid ink on the auxiliary active end face 16*a*, particularly on the end face part comes into question. For preventing this blur, it is effective that a configuration is made in such a manner that the material of the supporting substrate 16 has the same polarity of electroosmosis as the material of the dielectric substance substrate 14.

That is, when the dielectric substance substrate 14 makes the fluid ink 40 travel by electroosmosis toward a negative electrode, material is selected so that the surface of the supporting substrate 16 will also make the fluid ink 40 travel by electroosmosis toward a negative electrode. A similar selection is made in the case of electroosmotic travelling toward a positive electrode. Materials for the dielectric substance substrate 14 and the supporting substrate 16 may be of the same or different kind when the above-mentioned condition is met.

To the fluid ink 40 and the dielectric substance substrates 14, boro-silicate glass, silicate glass, cellulose acetate or the like is a suitable material meeting the above-mentioned condition for the supporting substrate 16.

FIG. 10 is a perspective view of the embodiments as shown in FIG. 8 through FIG. 10. This view examplifies the case where the fluid ink 40 makes electroosmotic travelling toward a negative electrode with respect to the dielectric substance substrate 14 and the supporting substrate 16. In the recording electrodes 21 adjacent to one another, the ON voltage Vc for ink supply and transcription negative with respect to the auxiliary electrode 33 is applied to A and the OFF voltage Vc′ for preventing ink supply and transcription positive, reverse polarity to Vc, is applied to B.

On the end edge 16*b* of the active end face 14*a* and the end edge part 16*c* of the recording electrode A, the ink protrusion 44 is formed by an electroosmotic travelling of the fluid ink 40 from the auxiliary electrode 33 through the active end face 14*a* of the dielectric substance substrate 14 and furthermore through the contacting gap 151 as exemplified by the arrow marks. On the other hand, in the recording electrode B, electroosmotic travelling is made toward the auxiliary electrode 33 corresponding to the amplitude of Vc′ through the active side end face 14*a* and furthermore through the contacting gap 151 as shown by the arrow marks, and since the adjacent electrode A is in a state of negative voltage with respect to the electrode B by the amplitude of Vc+Vc′, the fluid ink 40 on the electrode B makes a quick electroosmotic travelling through the auxiliary active end face 16a of the supporting substrate as exemplified by the arrow marks, contributing to the formation of the ink protrusion 44 on the electrode A.

Accordingly, on the end edge part 16c, the formation of the ink protrusion 44 on the electrode A is accelerated and concurrently the fluid ink 40 on the electrode B disappears, thereby a fluid ink pattern representing input information is formed on the end edge part 16c.

Accordingly, the ink transcription 43 is produced corresponding to the electrode A, and no ink transcription is made on the part corresponding to the electrode B, thereby an advantage is given that an ink picture recording of high resolution without blur is obtainable by this concentration and converging effect.

Furthermore, the above-mentioned movement of the fluid ink by electroosmosis takes place concurrently also in the contacting gap 151 when the porous dielectric substance substrate 14 is employed.

The modulation by means of electroosmosis of the fluid ink 40 on the auxiliary active end face 16a as described above is generated substantially by the potential difference between the signal electrode A and B, therefore Vc′ is not necessarily required to be of reverse polarity to Vc. That is, even if the polarity is the same, a similar ink movement is shown when its amplitude is smaller than Vc or zero, thus the recording apparatus in accordance with the present invention has a feature of making an ink picture recording with intrinsically small blur.

Furthermore, when the ink movement 40e in the contacting gap 151 is also utilized by employing the porous dielectric substance substrate 14 like the embodiments in FIG. 8 and FIG. 9, there is an advantage that a high concentration of recording can be made. However, in pressing and holding the porous dielectric substance substrate 14 onto the supporting substrate 16, the contacting gap 151 becomes extremely narrow if the pressure is high, thereby the degree of freedom of the ink movement 40e is sometimes spoiled.

In such case, when dents of net point-, mesh-, parallel grate-, or the like-shape with depth of, for example, about 10 to 70 μm are formed on the surface opposite to the auxiliary electrode 33, that is, the surface of the porous dielectric substance substrate 14 of the contacting gap 151 side by means of machining or embossing, the contacting gap is substantially enlarged, thereby the ink movement 40e between the recording electrode A and B, and between anti-backflow sealing agent 160 and the end edge 16b becomes smooth, and a high sensitivity of recording becomes possible.

It is preferable that the above-mentioned dents are disposed on the entire contacting gap reaching the end edge 16b. In the case of net-point-shaped dent comprising an aggregation of dot-shaped dents and the case of mesh-shaped dent comprising intersections of line-shaped or belt-shaped dents, the pitch of the respective dents is desirable to be selected at the same pitch as or a smaller pitch than the arrangement pitch of the recording electrodes 21.

Similarly, in the case of parallel-grate-shaped dent, it is desirable that its arrangement direction is parallel to the recording electrodes 21, and tips of one end of dents are exposed to the end edge 16b. The above-mentioned configuration of dent part is to be applied to all the embodiments of this specification employing a porous dielectric substance substrate, without limiting to the present embodiment.

Furthermore, in the FIG. 10, as described in FIG. 6(A) and FIG. 6(B), the recording sheet or medium 50 is inserted while contacting with the end edge part 16c, and a counter electrode 93 is installed to accelerate or suppress an ink transcription, thereto a positive or negative bias voltage, or a pulse voltage synchronized with the signal voltages Vc and Vc′ is applied from the signal source 74, thereby a more effective ink transcription can be made.

In this case, when the counter electrode 93 is divided into plural electrodes corresponding to the recording electrodes 21 and pulse voltage is selectively applied in synchronization with the signal voltage to respective recording electrodes 21, thereby the transcription of the ink protrusions 44 onto the recording surface 50a is selectively accelerated, a more sensitive recordin-is attainable.

As mentioned above, the present embodiment can make a simple recording of high resolution with small blur which operates at low voltage.

In addition, the color of the fluid ink can be adjusted freely by mixing color agents, therefore by means of multi-color printing combining a plural number of these apparatuses, a color recording can be carried out, thereby being exceedingly useful in industries.

Figure 11:
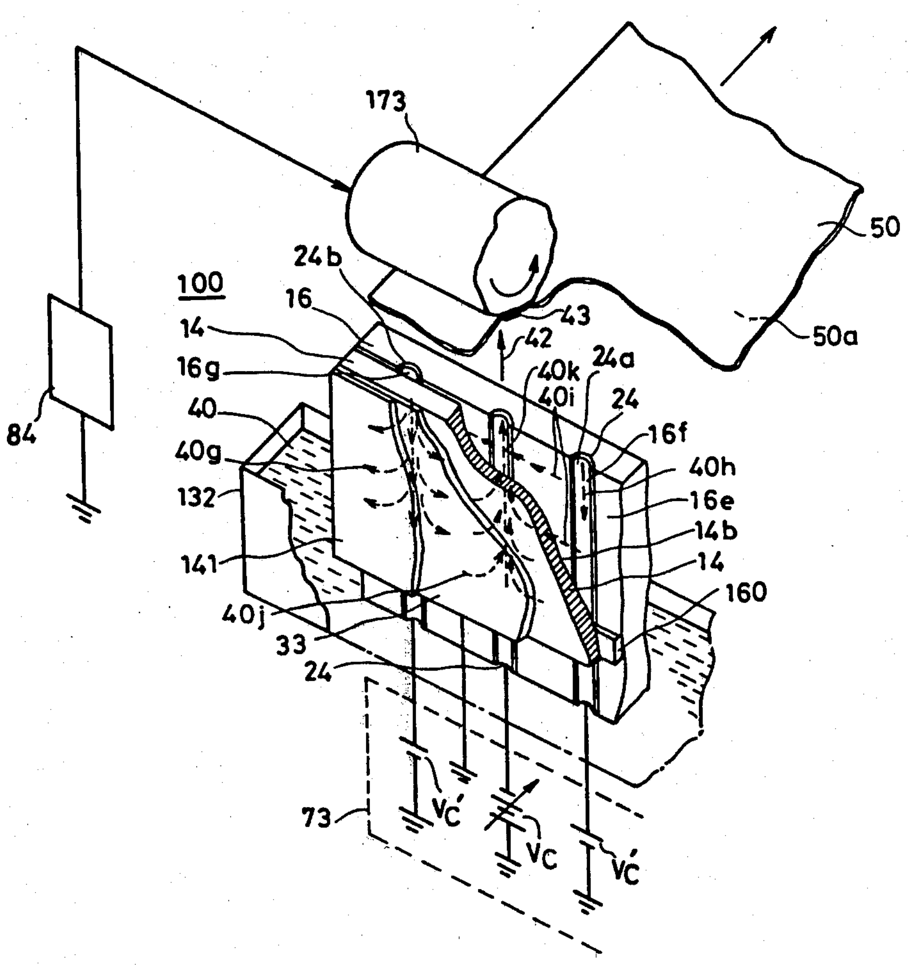
FIG. 11 is a perspective fragmental sectional view of the nineth embodiment of a recording apparatus in accordance with the present invention.

FIG. 11 is a perspective fragmental cross-sectional view of the ninth embodiment of a recording apparatus in accordance with the present invention.

As is already described, when the recording electrodes are installed on the supporting substrate surface, the fluid ink sometimes concentrates in excess on the conductive end tip part of the recording electrode depending upon the thickness of the recording electrode, thereby degrades a recorded picuture quality.

This embodiment purposes to improve this drawback and provides a recording apparatus by the new principle that an ink-flying is carried out directly on the recording medium by spouting the ink movement by electroosmosis from a nozzle-shaped ink-spouting hole.

In the figure, 100 is a recording head, 40 is a fluid ink which is accommondated in an ink container 132 and supplied to and impregnated into an ink head by immersing a part of the ink head 100. 73 is a signal voltage source, 50 is a recording sheet such as paper or the like which is a recording medium, 173 is a roller feeding the recording medium 50 in the direction of the arrow marks.

16 is a non-porous plate-shaped supporting substrate, on the surface 16e of which dents 16f which are arranged at a density of, for instance, 3 to 8 line per mm corresponding to the ink recording density, and dents 16f whose width is 50 to 200 μm corresponding to the above-mentioned recording density, and whose depth is about 20 to 150 μm are provided by the photoetching or sand blast method or die working. In these dents 16f, recording electrodes 24 comprising preferably a so-called ink-philic conductive paint such as graphite, silver or the like which becomes well-wetted with the fluid ink 40 are installed respectively.

In this case, the recording electrodes 24 may be formed in such a manner that a metal oxide film such as tin oxide or the like, an evaporation film such as gold, silver, charomium or the like, or a metal film such as plated film is coated on the wall surface in the dents 16f. Particularly these conductive films do not impregnate or absorb inks because of its non-porosity, therefore an advantage of assuring a stable and good operation is obtainable.

In any case, an surface 24*a* of the electrode 24 does not project over the supporting substrate surface 16*e*, and is flush with the surface 16*e*, or preferably located at more inner of the dent 16*f* than the surface 16*e* as exemplified in the figure, and form a gap part 16*g* between the porous dielectric substance substrate surface 16*e*. On the supporting substrate surface 16*e*, a porous dielectric substance substrate 14 is installed which has pores or gaps substantially penetrating in the direction of thickness through which the fluid ink 40 substantially can travel in the direction of the thickness. For the porous substrate 14, as is already described, for instance, so-called microporous membrane filter comprising cellulose acetate with width of 20 to 200 μm, mean pore diameter of 0.1 to 8 μm, and pore factor of 60 to 80% is employed. Besides, porous substrate such as glass, ceramics or the like can also be used. On the surface of opposite side to the supporting substrate 16 of the porous substrate 14, an auxiliary electrode 38 permeable to the fluid ink 40 is installed by thinly coating, for instance, a graphite conductive paint or the like. Furthermore, a press contact plate 141 permeable to the fluid ink 40 comprising metal, plastic, glass, ceramic plate or the like with numerous fine holes perforated in the direction of thickness is installed on the auxiliary electrode 33, and the porous dielectric substance substrate surface 14*b* is pressed and fixed onto the supporting substrate surface 16*e*.

At the end part of opposite side to the installation surface of the recording medium 50 of the porous substrate 14, the porous dielectric substance substrate 14 is sealed to the supporting substrate surface 16*e* and the electrode surface 24*a*, thereby prevents a backflow of fluid ink due to an electroosmosis as described later.

Furthermore, when the press contact plate 141 is formed with a conductor such as metallic mesh or the like, the press contact plate 141 can also serve as the auxiliary electrode 33.

The fluid ink is fed to and impregnated into the porous dielectric substance substrate 14 through the press contact plate 141 and the electrode 33. For the fluid ink 40, for instance, the already-mentioned solvent is used, which gives good electroosmotic travelling toward a negative electrode with respect to the abovementioned porous dielectric substance substrate 14 and the supporting substrate surface 16*e*.

The velocity of this electroosmotic travelling increases with the increase in signal voltage applied, and its maximum amplitude is so set that the field intensity will be about 2V/μm in view of breakdown.

The recording electrodes 24 are connected to the signal voltage source 73 respectively, and the signal voltage Vc and Vc′ are applied selectively across the auxiliary electrode 33 and the recording electrodes 24.

Now, operation is elucidated in reference to the case where such OFF voltage Vc′ that the auxiliary electrode 33 is negative with respect to the recording electrodes 24 and such ON voltage Vc that the recording voltages 24 are negative concersely with respect to the auxiliary electrode 33 are alternately applied as signal voltages as shown in FIG. 11.

On the portion where Vc′ is applied, the fluid ink 40 makes electroosmotic travelling from the electrodes 24 side forming positive electrode to the electrode 33 side forming negative electrode through the porous substrate 14 as indicated by the arrows marks 40*g*, and concurrently the fluid ink 40 located on the electrode end parts 24*b* side is also sucked up to the electrode 33 side through the gap part 16*g* as shown by the arrow mark 40*h*.

Furthermore, since the dielectric supporting substrate 16 is also so constituted as to have the same electroosmotic property as the porous dielectric substance substrate 14, the fluid ink 40 makes electroosmotic travelling on the dielectric supporting substrate surface 16*e* from the electrode 24 whereto Vc′ is applied toward the adjacent electrode 24 forming a negative electrode by Vc application as shown by the arrow marks 40*i*.

Accordingly, no fluid ink 40 can exist on the end part 24*d* side of the recording electrode 24 thereto Vc′ is applied and the surrounding end edge part of the dielectric supporting substrate 16.

On the other hand, on the recording electrode 24 part thereto Vc is applied, the fluid ink 40 penetrates through a press contact body 141 and the auxiliary electrode 33 and makes an electroosmotic travelling through the porous dielectric substance substrate 14 as indicated by the arrow marks 40*j*, and concentrates and converges toward the surface 24*a* of the recording electrode 24. Since the other end part side is sealed by the adhesive 160, the fluid ink 40 is pushed out toward the end part 24*b* side through the gap 16*g* by the electroosmotic pressure as shown by the arrow mark 40*k*.

In addition, the fluid ink makes an electroosmotic travelling also from the adjacent electrode which is a positive electrode through the dielectric supporting substrate surface 16*e* as shown by the abovementioned arrow marks 40*i* and gathers into the gap 16*g*. Therefor by this concentration and converging effect of the fluid ink 40 toward the surface 24*a* of the electrode 24 on the end part 24*b* side, the push-out of ink like this arrow mark 40*k* becomes more effective.

As is the case with the present embodiment, when the recording electrode 24 is accommodated in the groove-shaped dent 16*f* provided on the dielectric supporting substrate surface 16*e* and its electrode surface 24*a* is made to be flush with the dielectric supporting substrate surface 16*e* so as not to cause the abovementioned level difference or further installed in a sunk fashion so as to have a gap part 16*g* between the porous dielectric substrate surface 14*b* as shown in the figure, the fluid ink 40 can be converged accurately on the electrode surface 24*a*, thereby an advantage of recording a good quality of ink picture is obtainable.

In this case, the abovementioned converging effect increases with increase in the field intensity between adjacent electrodes 24, therefore the higher the arrangement density of the recording electrodes 24 is, that is, the higher the recording resolution is, the more advantage is obtainable.

Particularly, as is the case with the present embodiment, when the gap part 16*g* is provided, an advantage is obtained that the ink amount due to concentration and convergence of the fluid ink 40 on the end part 24*b* is effectively increased and a high contrast of ink picture recording can be made by the fluid ink pattern representing input information corresponding to Vc and Vc′.

Furthermore, as is the case with the present embodiment, the gap part 16*g* is provided, and the width and depth of a semi-circular cross-section of the gap part 16*g* formed by a groove is selected at, for instance, about 30 to 80 μm, and then the amplitude of the ON voltage Vc is set at a high voltage of about 1 to 2 volts per 1 μm of thickness of the porous dielectric substance substrate 14, a large amount of ink concentrates on the recording electrode 24 from a wide range of area of the porous dielectric substance substrate 14 by the electroosmotic pressure and the fluid ink 40 in the gap part 16g spouts out from the nozzle-shaped hole outlet (for instance, 70 μm in diameter) of the end part 24b of the recording electrode 24 as an ink jet, and flies to the recording surface 50a of the recording sheet 50, thereby the ink deposit spot 43 can be produced. The amount of this ink deposit spot 43, that is, the ink concentration is increased with increase in amplitude, thereby an advantage of making an ink recording of concentration corresponding to Vc' is obtainable. A good ink-flying 42 can be carried out effectively when the ON voltage is applied in a pulse form, and when the gap between the end part 24b and the recording sheet 50 is extremely wide, an ink recording picture becomes vague, therefore, a narrow value of, for instance, about 50 to 100 μm is selected.

Thus, when the present embodiment is applied, no fluid ink 40 exists on the end part 24b and no ink deposit spot 43 is produced on the recording sheet 50.

On the other hand, the ink deposit spot 43 based on ink-flying 42 is obtained from the end part 24b whereto Vc is applied by means of electroosmosis, thereby a noncontact type recording apparatus can be realized.

Accordingly, in the figure, the signal voltages Vc and Vc' from a signal voltage source is selectively applied in a line sequencial fashion or the like, and the recording sheet 50 is moved in the direction of arrow mark by means of a roller 173 in synchronization with the abovementined Vc and Vc', thereby an ink image corresponding to the signal voltage can be recorded and reproduced by a fluid ink pattern representing the input information of Vc and Vc' formed on the electrode end tip part 24b respectively.

An application of the OFF voltage Vc' of reverse polarity to the ON voltage Vc is usefull for an ink printing of high resolution, but when the amplitude thereof is great in excess, the fluid ink 40 is excessively sucked in from the end part 24b, thereby the rise at Vc application is sometimes delayed. Therefore, it is desirable that these values of Vc' are selected at small values, for instance, at anout one-tenth in comparison with the maximum amplitude of Vc or the product of maximum amplitude and maximum pulse width. Also Vc'=0 can sometimes be applied.

Furthermore, for the fluid ink 40, a water ink can also be used. An ink making an electroosmotic travelling toward a positive electrode can also be used, and in this case, operation is made likewise by applying Vc and Vc' with the polarity reversed to the abovementioned.

In addition, in the present embodiment, one or both end parts of the recording surface 50a side of the porous dielectric substance substrate 14 and the dielectric supporting substrate 16 are tapered aslant, and the tip of the recording head 100 is located so as to protrude toward the recording sheet 50, thereby a contamination by the fluid ink 40 due to contact of the recording sheet 50 with unnecessary parts of the recording head can be prevented.

Furthermore, the roller 173 is made of metal to serve as a counter electrode and an auxiliary power source 84 is connected to this, thereby an ink-flying by means of electroosmotic pressure can be controlled. For instance, in the figure, when a negative bias voltage is supplied to the roller electrode 173 from the auxiliary power source 84 and the voltage is applied to the fluid ink 40 on the electrode end part 24b through the recording medium 50, the ink-flying 42 is accelerated and when a positive bias voltage is applied the ink-flying 42 is suppressed. Thus, the fine adjustment of density of the ink deposit spot 43 can be controlled. To make this fine adjustment, a low voltage of 1 KV or less is desirable for the bias voltage.

Furthermore, like the case in FIG. 10, when the end face of the porous dielectric substance substrate 14 is shifted from the end face of the dielectric supporting substrate 16 by about 50 to 200 μm to form an exposed auxiliary active end face 16a, a concentrating and converging action of the fluid ink 40 on this part by applying Vc and Vc' alternately can be utilized.

Therefore the abovementioned configuration is preferable for a high resolution of recording.

Furthermore, like the cases in FIG. 5(A), FIG. 5(B) and FIG. 10, the recording head 100 of the present embodiment can also by employed as a contact type recording apparatus by contacting the electrode end edge part 24d directly with the recording medium surface 50a.

Furthermore, in the apparatus in FIG. 11, including the abovementioned configuration, the dielectric supporting substrate 16 is constituted with a second porous dielectric substance substrate similar to the porous dielectric substance substrate 14, and a second auxiliary electrode and a second press contact body similar to 33 and 141 can be installed in sequence on the outer surrace side.

Thus, when the ON voltage Vc and OFF voltage Vc' are selectively applied across the abovementioned two kinds of auxiliary electrodes and the recording electrodes 24, an electroosmotic travelling of the fluid ink 40 takes place symmetrically through the abovementioned two kinds of porous dielectric substance substrate, thereby a more effective ink-flying of fluid ink by means of electroosmotic pressure is obtainable.

Furthermore, the recording electrode 24 in the present embodiment is so constituted as to be permeable to the fluid ink by coating a conductive paint or the like on the inner wall of the dents 16f of a second porous dielectric substance substrate forming the dielectric supporting substrate 16 to cause a more effective electroosmotic travelling of the fluid ink 40. However, a better permeability to the ink is obtainable in such a manner that the electrodes 24 is made of thin conductive wires such as metallic wires, and also the diameter of this conductive wire is selected thinner than the width and depth of the dent 16f, and then the wire is disposed in the dent 16f, thereby no permeability to the ink is spoiled and more effective operation is made.

FIG. 12 is perspective fragmental structure view of the tenth embodiment of a recording apparatus in accordance with the present invention and the present embodiment is a further improved type of the recording apparatus utilizing the ink-flying method by means of coulomb force in FIG. 11.

In the configuration in FIG. 11, a metallic wire such as tungsten, copper or the like with diameter thinner than or nearly equal to both width and depth, for instance, 20 to 70 μm respectively, of this dent 16f, for instance, 20 to 50 μm in diameter, is accommodated and fixed in a groove-shaped dent 16f. The top surface of this electrode may project over the dielectric supporting substrate surface 16e. However, as exemplified in the figure, it is preferably so fixed as to be located below the dielectric supporting substrate surface 16e.

An application of such configuration has an advantage that the electroosmotic travelling of the fluid ink 40 can be effectively controlled through the gap between the surface of the porous dielectric substance substrate 14 and the surface of the recording electrode 25 in a groove-shaped dent 16*f*. An end tip 25*c* of the recording electrode 25 is located flush with the dielectric supporting substrate end edge 16*c* or inside thereof, or may protrude a little toward a flying-gap 220. However, an protrusion of about 10 to 100 $\mu$m as exemplified in the figure is desirable for an effective ink-flying 42 by means of coulomb force.

Furthermore, the shape of the end tip 25*c* can be constituted in a cone or conical pedestal shape by tapering the wire toward the flying gap 220, and in this case an effective ink-flying 42 is obtainable by a concentration of lines of electric force.

Furthermore, when the diameter of metallic wire is extremely thin to the extent of about 10 to 30 $\mu$m, a metal wire forming the recording electrode 25 can be fixed directly on the surface of the dielectric supporting substrate 16*e* without providing the dent groove 16*f*.

The fluid ink 40 is supplied from an ink container 133 to the porous dielectric substance substrate 14 through a spongy body 230 provided on an auxiliary electrode 37 comprising a metallic mesh by means of capillary phenomenon.

The recording electrodes 25 are connected to a signal voltage source 75, and the positive bias voltage $V_D$ for separation which is of the same polarity as Vc′ is applied in common to alternate electrodes 25*a* among the recording electrodes 25, and the signal voltage containing input information comprising the ON voltage Vc and the OFF voltage Vc′ are applied selectively to electrodes 25*b* located between these electrodes 25*a*.

Like the embodiments in FIGS. 1, 2, 3, 5, 7, 8, 10 and 11, not limited to the present embodiment, the concentration and convergence effect of the fluid ink 40 utilizing an electroosmotic phenomenon on the dielectric supporting substrate surface onto the recording electrode when the ON voltage signal is applied is based on the potential difference between the adjacent recording electrode, and this effect effectively appears when the OFF voltage signal is ayplied to adjacent recording electrode, but it scarcely appears when the ON voltage signals which are adjacent to each other and have equal amplitude are applied simultaneously.

Accordingly, in the former case, since an independent sharp ink protrusion is produced on the end tip of the recording electrode thereto the ON voltage signal is applied, a good ink-flying is produced by the ink-flying recording method by means of coulomb force, and also an independent point-shaped ink deposit spot corresponding to the shape of the end tip of the electrode is obtained by the contact transcription recording method.

However, in the latter case, since belt-shaped dull ink protrusions having a large amount of ink but connected to one another are produced on the dielectric supporting substrate end edge part, the ink-flying becomes unstable by the coulomb force method, and a belt-shaped ink deposit of high density is liable to be produced by the contact transcription method.

In the normal ink picture recording, the signal voltage application states of the former and the latter are mixed irregularly, therefore, when an operation system is applied wherein only the signal voltage is applied selectively to the recording electrode, a missing of ink deposit spot takes place in a recorded ink picture by the coulomb method, and a belt-shaped dense ink deposit is produced by the contact transcription method, thereby a qualitative degradation of ink picture is liable to be caused.

Then, as shown in FIG. 12, the recording electrodes 25*a* among the recording electrodes 25 are utilized as auxiliary electrodes for separation, thereto the bias voltage $V_D$ of the same polarity as the OFF voltage Vc′ is applied, and the signal voltage which comprises the ON voltage Vc and the OFF voltage Vc′ modulated by input information is applied to the remaining recording electrodes 25*b*. By doing so, when the ON voltage Vc is applied, the fluid ink 40 always concentrates and converges from the electrodes 25*a* side to the electrodes 25*b* side, thereby the ink protrusion is formed, and the recording electrodes 26 are electrically separated and insulated from one another by the presence of the auxiliary electrodes 25*a* for separation kept at the $V_D$ potential.

Accordingly, an ink protrusion having an ink amount always correctly corresponding to the amplitude or the pulse width of the ON voltage Vc and independent from adjacent dots is formed, thereby the abovementioned problems are solved.

When the bias voltage for separation, $V_D$ is of the same polarity as the OFF voltage Vc′ (reverse polarity to the ON voltage Vc), no amplitude is limited. It is desirable that the amplitude is preferably selected at the same value as the OFF voltage Vc′.

Furthermore, in the case of the coulomb method, no ink-flying can be carried out unless more than a certain amount of ink, namely, an ink protrusion is formed.

Accordingly, in this case, within a range meeting the abovementioned conditions, Vc′ and $V_D$ can be selected at the same polarity as Vc and their amplitudes can be set at $|Vc| \geqq |Vc'|$, $|V_D| \leqq |Vc'|$. As a special case, the voltages can be set at $V_D = Vc = 0$.

As mentioned above, employing alternate electrodes as auxiliary electrodes for separation and selecting the relationships of $V_D$ application, and amplitude and voltage polarity of $V_D$, Vc′ and Vc as described above are applicable to all the present invention such as the abovementioned embodiments in FIGS. 1–5, FIGS. 7–8, and FIGS. 10–11, not limited to the embodiment in FIG. 12.

In the case utilizing an effect of concentration and convergence of the fluid ink 40 from the electrodes 25*a* to the electrodes 25*b*, it is preferable to form the exposed auxiliary active end face 16*a* of about 50 to 200 $\mu$m in width on the surface of the dielectric supporting substrate 16, and forming an exposed active end face 14*c* of about 50 $\mu$m to 200 $\mu$m in width likewise between an auxiliary electrode 37 and the end part of the porous dielectric substance substrate 14 is a preferable configuration from the standpoints of preventing a breakdown between the auxiliary electrode 37 and the recording electrodes 25 through the side active end face 14*a* and of producing a more effective concentration and convergence effect of the fluid ink 40.

Furthermore, the configuration of the exposed auxiliary active end face 14*c* is to be applicable to the other embodiments likewise, not limited to the present invention.

Thus, when the ON voltage Vc produced by modulating input signal information is applied to the recording electrodes 25*b* as shown in the figure, a definitely independent ink protrusion 44 is produced on the end tip of each recording electrode 25*b*, and when the OFF voltage Vc′ is applied, this protrusion disappears and a fluid ink pattern corresponding to the input signals Vc and Vc′ is produced on the end tip of the recording electrodes 25*b*. No fluid ink 40 can exist on the end tip of the recording electrode 25*a* whereto the bias voltage for separation $V_D$ is applied.

Accordingly, the DC bias $V_A$ is applied to a counter electrode 94 from a high voltage power source 85, and the amplitude is selected so that the ink-flying 44 will take place when the ink protrusion 44 is produced, and then the ink deposit spot 43 corresponding to the input signal is produced. Accordingly when the recording medium 50 is moved corresponding to the input signal as shown by the arrow mark 51, an ink picture is recorded and reproduced.

In this case, when $V_A$ is made negative with respect to the auxiliary electrode 37 like the ON voltage Vc as shown in the figure, the ink-flying 42 is often obtainable with a lower voltage in comparison with the case with the positive $V_A$. For instance, when the gap between the end tip of the recording electrode 25 and the counter electrode 94 is set at about 200 μm, $V_A$ of about −1500 V is required at Vc=−150 V. On the other hand, when $V_A$ is made positive, sometimes $V_A$ of about +1800 V is required.

As shown in the present embodiment, when the coulomb force method is utilized, the ink protrusion sometimes flows out through the side end face 16*d*, thereby making the operation unstable. To prevent such unstable operation, as exemplified in the figure, it is effective to coat a so-called ink repellent 210 which repels the fluid ink 40 on the side end face 16*d*.

Fluorine family polymers which are materials having extremely low surface tension of 11 dynes/cm whereby both oil and water including the abovementioned fluid ink 40 (for instance, Fluorad FC-721, anti-flow coating agent, tradename of 3M Company of USA) are repelled are effective ink repellents for both solvent ink and water ink.

The configuration which substantially provides an ink-repelling property on the side end face of the supporting substrate located on the recording surface 50*a* side is to be applicable alike to the other embodiments, not limited to the present embodiment.

Figure 13:
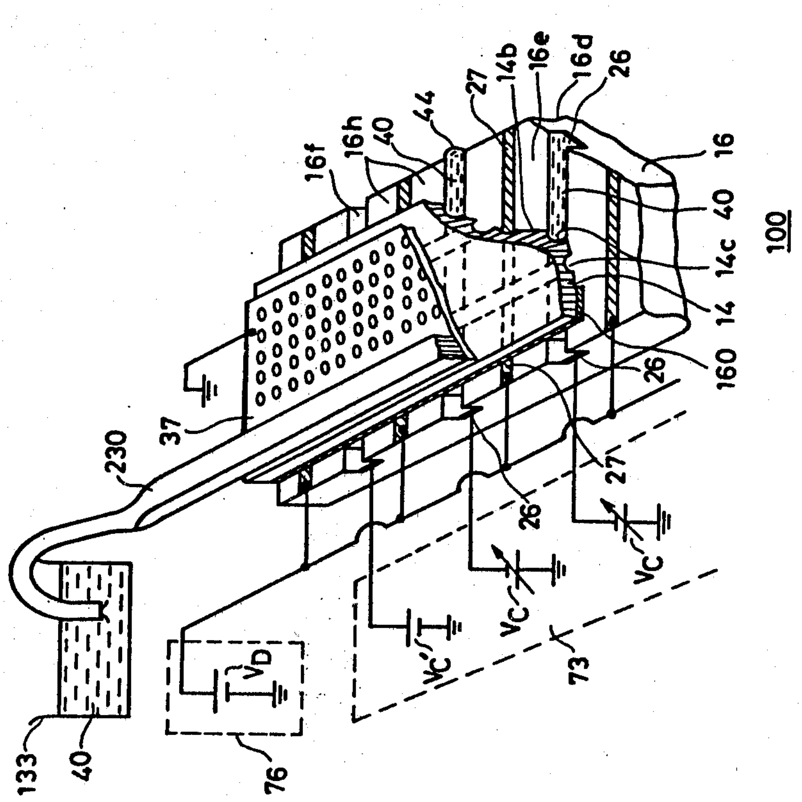
FIG. 13 is a perspective fragmental view of the eleventh embodiment of a recording apparatus in accordance with the present invention.

FIG. 13 is a perspective fragmental structure view of eleventh embodiment of a recording apparatus in accordance with the present invention.

In the recording apparatus of FIG. 12, the alternate recording electrodes serve as auxiliary electrodes for separation, therefore the number of recording electrodes for producing picture elements per unit length is reduced by a half, thereby the resolution of ink recording image is deteriorated. In the present invention, auxiliary electrodes for separation 27 are installed separately from the recording electrodes 26 on gap surfaces 16*h* between the recording electrodes 26 on the surface of the dielectric supporting substrate 16.

Such configuration has an advantage of stabilizing operation without reducing the arrangement density of the recording electrodes.

In the present embodiment, the recording electrode 26 is installed by forming a metal evaporation film in a groove-shaped dent 16*f*, however, a metallic wire may be embedded as shown in FIG. 12, or further a metallic wire may be disposed on the abovementioned metal evaporation film alternatively.

The recording electrodes 26 are connected to the signal voltage source 73, whereto the ON voltage Vc and the OFF voltage Vc′ are selectively applied respectively. The auxiliary electrodes 27 are connected in common to an auxiliary bias power source 76 and the bias voltage for separation $V_D$ is applied.

Thus, the ink protrusion 44 is independently formed on the end tip of the recording electrode 26, to which the ON voltage is applied. On the other hand, the ink protrusion 44 disappears on the part, whereto the OFF voltage Vc′ is applied. Thus a controlled fluid ink pattern representing input information is formed stably.

Accordingly, an ink picture recording on the recording surface can be made by the coulomb force method, contact transcription method, electroosmotic flying method or combinations of these methods as already described.

The ink protrusion 44 on the electrode end tip is controlled by the electroosmotic travelling of the fluid ink 40 in the direction of thickness of the porous dielectric substance substrate 14 and on the dielectric supporting substrate surface 16*e* (that is, gap part surface 16*h*).

Accordingly, when the dot-point-shaped, mesh-shaped, or parallel-grate-shaped dent 14*c* is installed on the porous dielectric substance substrate surface 14*b*, and the substantial contacting gap between the porous dielectric substance substrate surface 14*b* and the dielectric supporting substrate surface 16*e* is designed widely as is already described, the degree of freedom of fluid ink movement by an electroosmosis on the abovementioned dielectric supporting substrate surface 16*e* is increased, thereby a high sensitivity of operation is obtained.

In the present embodiment, the case with a net-shaped dent 14*c* is exemplified as one example of the above.

Furthermore, an ink-repelling property can slso be given substantially by coating an ink-repellent on the side end face 16*d* of the dielectric supporting substrate 16 as required like the case in FIG. 12 or the like.

In addition, although the recording head is held nearly horizontally in FIGS. 12 and 13, a fine adjustment of recording operation can be made by holding the recording head somewhat in an upward or downward direction from a horizontal state.

The above elucidation is made on the configuration wherein an electroosmotic travelling on the dielectric supporting substrate is made in the same polarity as the porous dielectric substance substrate with respect to the fluid ink, but the material itself of the supporting substrate is not always required to have an electroosmotic property. What is required to have an electroosmotic property is the dielectric supporting substrate surface of the side where the porous dielectric substance substrate is installed.

Accordingly, for the configuration wherein the abovementioned fluid ink travels on this dielectric supporting substrate surface, an electroosmotic property may be given substantially on the dielectric supporting substrate surface by attaching or coating a thin film such as cellulose acetate, nitrocellulose or the like.

Various configurations and operating systems as elucidated in detail above are to be applicable by combining them suitably. As mentioned above, the present invention is a recording apparatus which utilizes the electroosmosis of the fluid ink with respect to the solid state dielectric substance substrate, and various recording apparatuses of high performance can be realized by the coulomb force method, contact transcription method, electroosmotic flying method, or the like.

What is claimed is:

1. A recording apparatus comprising:

a recording head having a singular or plural recording electrodes insulated from one another which have an exposed conductive part facing a recording surface of a recording medium and sandwiched between a plural number of filmy dielectric substance substrates, an auxiliary electrode installed at a surface side opposite to said recording electrode of at least one of said dielectric substance substrate, an ink feeding means for feeding an ink, which have an electroosmotic property with respect to at least said dielectric substance substrates contacting said auxiliary electrode, at least onto said dielectric substance substrate, a record controlling means having a voltage generating means for applying a voltage across said recording electrode and said auxiliary electrode for forming a fluid ink pattern as a variation of ink amount on said exposed conductive part facing said recording surface of said recording electrodes by travelling of said fluid ink by means of electroosmosis at least on said dielectric substance substrates contacting said auxiliary electrode, said voltage being modulated responding to input signal information, a media for recording and reproducing an ink picture corresponding to said input signal information on said recording surface by depositing said fluid ink pattern thereonto.

2. A recording apparatus in accordance with claim 1, wherein said plural number of dielectric substance substrates are disposed in positions to make said fluid ink travel by means of electroosmosis, and in a manner that all of polarities of said electroosmosis are the same.

3. A recording apparatus in accordance with claims 1 or 2, wherein said dielectric substance substrate has a plural number of recording electrodes formed on both opposite surfaces of said dielectric substance substrate forming said exposed end tips to face said recording medium at an edge part of said dielectric substance substrate, a first auxiliary electrode permeable to said fluid ink is installed on one outer surface of said dielectric substance substrate with a first porous dielectric substance substrate sandwiched inbetween, a second auxiliary electrode permeable to said fluid ink is installed on the other outer surface of said dielectric substance substrate with a second porous dielectric substance substrate sandwiched inbetween, and the apparatus further has a means for supplying and impregnating said fluid ink into said first and second porous dielectric substance substrates and a means for applying signal voltages across said first and second auxiliary electrodes and said recording electrode.

4. A recording apparatus in accordance with claim 3, wherein said recording electrode on both faces are separate at said edge part, thereby forming recording electrodes opposing to and insulated from each other respectively are formed on both surfaces of said dielectric substance substrate, in a manner that signal voltage is to be applied across said recording electrodes and said first auxiliary electrode and said second auxiliary electrode respectively and independently.

5. A recording apparatus in accordance with claim 4, wherein said recording electrodes disposed opposing and insulated on both surface of said dielectric substance substrate are arranged in a manner to be shifted by a half pitch thereof from each other.

6. A recording apparatus in accordance with claim 5, wherein said fluid ink supplied and impregnated respectively into said first porous dielectric substance substrate and that into said second porous dielectric substance substrate are of the same color.

7. A recording apparatus in accordance with claim 5, wherein said fluid ink supplied and impregnated respectively into said first porous dielectric substance substrate and that into said second porous dielectric substance substrate are of different colors.

8. A recording apparatus in accordance with claim 2, wherein said auxiliary electrodes are of permeable substance to fluid ink and are formed above said dielectric substance substrate having said recording electrodes installed thereon, with porous dielectric substance substrate sandwiched inbetween, and an electroosmotic property to fluid ink is given to said dielectric substance substrate by coating a dielectric material of the same electroosmotic property as said porous dielectric substance substrate.

9. A recording apparatus in accordance with claim 2, wherein said dielectric substance substrate are of porous dielectric subtance substrate, and a gap is provided between said recording electrodes and said porous dielectric substance substrate, and one end of said gap is sealed, thereby making a fluid ink travel said gap through said dielectric substance substrate and reach end tips of said recording electrodes through said gap.

10. A recording apparatus in accordance with claim 9, wherein grooves are provided on a surface of said porous dielectric substance substrate, and said recording electrodes are installed on inner faces of said grooves, and a porous dielectric substance substrate as said dielectric substrate substance is disposed on a surface of said dielectric substance substrate, thereby to form gaps between said recording electrodes and said porous dielectric substance substrate.

11. A recording apparatus in accordance with claim 10 wherein a plural number of recording electrodes are fixed with a predetermined pitch on a supporting substrate of a dielectric substance, and thereon said dielectric substance substrate and further thereon said auxiliary electrode are fixed, and the end part of said supporting substrate and said end tip parts of said recording electrodes are exposed from an offset end part of said dielectric substance substrate at the part facing said recording face.

12. A recording apparatus in accordance with claim 1, which further comprises a counter electrode installed at a position facing said exposed conductive parts of said recording electrodes of said recording head, sandwiching said recording medium inbetween, in a manner that said fluid ink pattern is made to transfer onto said recording medium by means of coulomb force by giving a potential difference between said recording electrodes and said counter electrode.

13. A recording apparatus in accordance with claim 12, wherein said potential difference given between said recording elecsrodes and said counter electrode contains said input signal information.

14. A recording apparatus in accordance with claim 12, wherein said voltage applied across said recording electrodes and said auxiliary electrodes contains said input signal information, in a manner that said fluid ink pattern, wherein at least either one of ink amount or ink protrusion amount thereof is controlled, represents input signal information.

15. A recording apparatus in accordance with claim 1, wherein said voltage applied across said recording electrodes and said auxiliary electrode contains said input signal information, and said recording means contains a means for bringing said recording head in contact with said recording medium surface, in a manner that said fluid ink pattern, wherein at least either one of ink amount or ink protrusion is controlled by means of said voltage, is deposited by contacting on said recording surface on said recording medium.

16. A recording apparatus in accordance with the claim 15, wherein a counter electrode is provided on said recording electrodes of said recording head, at a position facing said exposed conductive parts, with said recording medium sandwiched inbetween, thereby to control amount of said fluid ink deposited onto said recording surface by applying a record controlling voltage across said recording electrodes and said counter electrode.

17. A recording apparatus in accordance with claim 1, wherein said record controlling means comprises a means of modulating said voltage, which is applied across said recording electrodes and said auxiliary electrode, by said input signal information, in a manner that said fluid ink pattern, wherein at least either one of fluid ink amount or protrusion amount thereof is controlled by electroosmosis by said modulated voltage, is formed on exposed conductive parts side of said recording electrodes of said recording head, and recording is made by flying ink on said recording medium by means of electroosmotic pressure of said fluid ink.

18. A recording apparatus in accordance with claim 17, wherein a counter electrode is provided on said recording electrodes of said recording head, at a position facing said exposed conductive parts, with said recording medium sandwiched inbetween, thereby to control amount of said fluid ink deposited onto said recording surface by applying a record controlling voltage across said recording electrodes and said counter electrode.

19. A recording apparatus in accordance with claim 1, 2, 12 to 17 or 18, wherein said recording head has a row of a plural number of recording electrodes insulated from one another, said recording electrode being selectively applied with input signal voltage modulated by said input signal information to respective one of said electrodes with respect to said auxiliary electrodes, said input signal voltage containing ON voltage signal which makes said fluid ink travel electroosmotically from said auxiliary electrode side to said exposed conductive parts side of said recording electrodes on or through said dielectric substance substrate, and OFF voltage signal of constant amplitude which is of reverse polarity to said voltage signal for causing electroosmotic travelling in the reverse direction to the above.

20. A recording apparatus in accordance with claim 19, further comprising a means for applying a bias voltage of the same polarity as said OFF voltage signal to alternate said recording electrodes and applying input signal voltage containing said ON voltage signal and said OFF voltage signal selectively to the remaining recording electrodes.

21. A recording apparatus in accordance with claim 19, wherein a second auxiliary electrodes are installed at respective electrode gap parts of said recording electrodes, and a bias voltage of the same polarity as said OFF voltage signal is applied to said auxiliary electrode.

22. A recording apparatus in accordance with claim 1, wherein said dielectric substance substrate are of porous dielectric substance substrate, and a gap is provided between said recording electrodes and said porous dielectric substance substrate, and one end of said gap is sealed, thereby making a fluid ink travel said gap through said dielectric substance substrate and reach end tips of said recording electrodes through said gap.

23. A recording apparatus in accordance with claim 22, wherein grooves are provided on a surface of said porous dielectric substance substrate, and said recording electrodes are installed on inner faces of said grooves, and a porous dielectric substance substrate as said dielectric substrate substance is disposed on a surface of said dielectric substance substrate, thereby to form gaps between said recording electrodes and said porous dielectric substance substrate.

24. A recording apparatus in accordance with claim 23, wherein a plural number of recording electrodes are fixed with a predetermined pitch on a supporting substrate of a dielectric substance, and thereon said dielectric substance substrate and further thereon said auxiliary electrode are fixed, and the end part of said supporting substrate and said end tip parts of said recording electrodes are exposed from an offset end part of said dielectric substance substrate at the part facing said recording face.

25. A recording apparatus in accordance with claim 1, wherein said ink supplying means is provided with an auxiliary plate facing an auxiliary electrode, and said fluid ink is poured between said auxiliary electrode and said auxiliary plate.

26. A recording apparatus in accordance with claim 1, wherein grooves are provided on a surface of said porous dielectric substance substrate, and said recording electrodes are installed on inner faces of said grooves, and a porous dielectric substance substrate as said dielectric substrate substance is disposed on a surface of said dielectric substance substrate, thereby to form gaps between said recording electrodes and said porous dielectric substance substrate.

27. A recording apparatus in accordance with claims 1, 2, 10, 23 or 26, wherein said dielectric substance substrates comprises a non-porous dielectric substance substrate and a filmy porous dielectric substance substrate, and a plural number of said recording electrodes are arranged insulated from one another between said dielectric substance substrates, and said end tip part of each said recording electrode is exposed toward said recording medium, and said auxiliary electrode is of permeable substance to a fluid ink and is located on a surface of said porous dielectric substance substrate, and a side end face facing said recording medium of said dielectric substance substrate is constituted as an ink-repelling surface which is repellent against said fluid ink.

28. A recording apparatus in accordance with claim 27, wherein said ink-repelling surface is made by coating an ink-repellent agent on said side end face.

29. A recording apparatus in accordance with claim 26, wherein a plural number of recording electrodes are fixed with a predetermined pitch on a supporting substrate of a dielectric substance, and thereon said dielectric substance substrate and further thereon said auxiliary electrode are fixed, and the end part of said supporting substrate and said end tip parts of said recording electrodes are exposed from an offset end part of said dielectric substance substrate at the part facing said recording face.

30. A recording apparatus in accordance with claim 1, wherein a plural number of recording electrodes are fixed with a predetermined pitch on a supporting substrate of a dielectric substance, and thereon said dielectric substance substrate and further thereon said auxiliary electrode are fixed, and the end part of said supporting substrate and said end tip parts of said recording electrodes are exposed from an offset end part of said dielectric substance substrate at the part facing said recording face.

31. A recording apparatus in accordance with claim 1, wherein porous dielectric substance substrate is employed as said dielectric substance substrate and dents are provided on said recording electrode side of said dielectric substance substrate.

32. A recording apparatus in accordance with claims 1, 2, 9, 11, 22, 24, 29, 30 or 31, wherein at least one of dielectric substance substrates is a porous dielectric substance substrate, and said auxiliary electrodes installed on said porous dielectric substance substrate is of a substance permeable to said fluid ink.

33. A recording apparatus in accordance with claim 1, wherein said recording electrode is an insulator-coated conductive wire comprising a metallic wire coated with an insulator.

34. A recording apparatus in accordance with claim 1, wherein said recording electrode is of metallic wire.

35. A recording apparatus in accordance with claim 34, wherein said recording electrode of metallic wires are installed each in dent groove formed on a surface of said dielectric substance substrate.

36. A recording apparatus in accordance with claim 35, wherein end tip parts of said recording electrodes of metallic wires protrude into a flying gap from an end edge part of said dielectric substance substrate.

* * * * *